United States Patent [19]

Hata et al.

[11] Patent Number: 5,057,857
[45] Date of Patent: Oct. 15, 1991

[54] PHOTOGRAPHIC CAMERA SYSTEM HAVING A PSEUDO FOCAL LENGTH MODE

[75] Inventors: Yoshiaki Hata; Nobuyuki Taniguchi, both of Nishinomiya; Takeo Hoda, Kawachinagano; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 476,610

[22] Filed: Feb. 7, 1990

Related U.S. Application Data

[62] Division of Ser. No. 293,082, Jan. 3, 1989, Pat. No. 4,926,203, which is a division of Ser. No. 924,425, Oct. 29, 1986, Pat. No. 4,860,039.

[30] Foreign Application Priority Data

Oct. 31, 1985 [JP] Japan .................................. 60-242736
Oct. 31, 1985 [JP] Japan .................................. 60-242738
Nov. 11, 1985 [JP] Japan .................................. 60-252472
Nov. 27, 1985 [JP] Japan .................................. 60-265008
Nov. 27, 1985 [JP] Japan .................................. 60-265009

[51] Int. Cl.⁵ .............................................. G03B 17/24
[52] U.S. Cl. .................................................... 354/106
[58] Field of Search ........................ 354/105, 106, 109

[56] References Cited

U.S. PATENT DOCUMENTS

| 4,515,452 | 5/1985 | Tsuzuki | 354/106 |
| 4,847,646 | 7/1989 | Taniguchi et al. | 354/106 |
| 4,862,201 | 8/1989 | Tanaguchi et al. | 354/105 |

Primary Examiner—W. B. Perkey
Attorney, Agent, or Firm—Burns, Doane, Swecker & Mathis

[57] ABSTRACT

A photographic camera system including a mode setting device for selectively setting the system to a real focal length photographing mode for printing an ordinary photographic zone and a pseudo focal length photographing mode for printing a zone narrower than the ordinary photographic zone, a recording device for recording on a film information corresponding to a set one of the photographing modes, a data imprinting device for imprinting data such as date at one of different positions on a photographing portion of the film and a selector device for selecting the one of the different positions in accordance with the set one of the photographic modes.

24 Claims, 30 Drawing Sheets

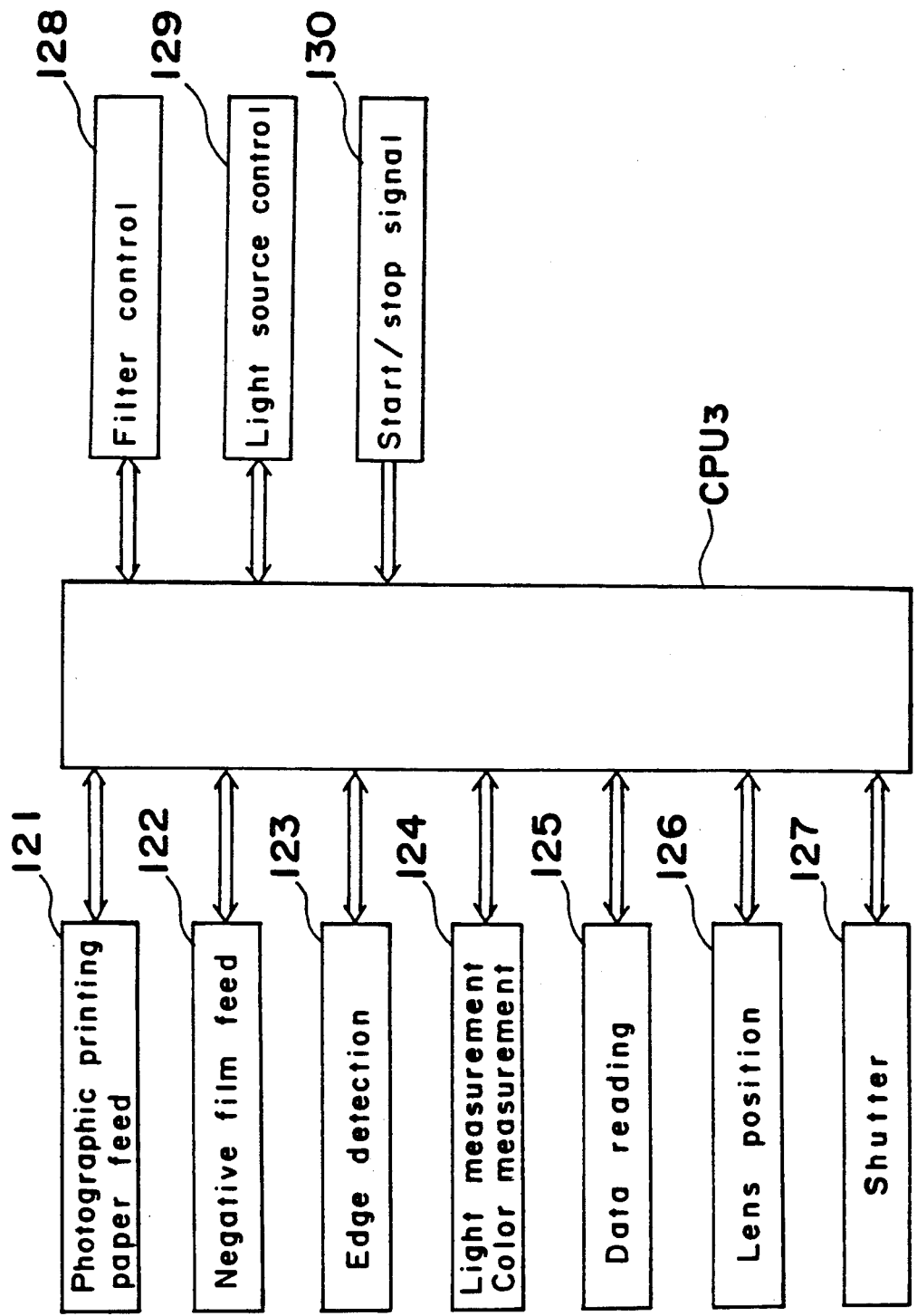

PHOTOGRAPHIC CAMERA SYSTEM HAVING A PSEUDO FOCAL LENGTH MODE

This application is a division of application Ser. No. 293,082, now U.S. Pat. No. 4,926,203, filed Jan. 3, 1989, which is a division of application Ser. No. 924,425, filed Oct. 29, 1986, now U.S. Pat. No. 4,860,039.

BACKGROUND OF THE INVENTION

1. Field of the Invention

The present invention relates to a photographic camera system, and more particularly to a photographic camera system for enabling pseudo telephoto and pseudo panoramic prints to be obtained from normal exposures by coding an exposure to identify a selected type print.

2. Description of the Prior Art

Conventionally, for example, Japanese Patent Laid-Open Publication No. 26721/1979, U.S. Pat. No. 4,583,831 and U.S. Pat. No. 3,490,844 have proposed a photographic camera system constituted by a camera which is provided with an operating member capable of designating, in each frame of a film, a printing zone to be printed, at the time of photographing an object, in the vicinity of the image plane of the film a data indicative of the printing zone and a printer which reads the data for each frame from the film photographed by the camera so as to print the designated printing zone on the basis of the data. In photographic camera systems of the above described type, in the case where the printing zone is so designated at the time of photographing an object as to be narrower than an ordinary printing zone and a print is made by enlarging size of the print to that of an ordinary print at the time of printing the film, the zone narrower than that of the ordinary print is enlarged in the print and thus, the print is equivalent to a print photographed by an objective lens having a focal length longer than that of the objective lens of the camera. Therefore, an effect substantially equivalent to an effect gained upon change of the focal length of the objective lens can be advantageously achieved.

Meanwhile, recently, cameras provided with a data imprinting device for imprinting at an end portion in the frame, data such as dates of photographing objects are widely commercially available. Then, if the data imprinting device is provided in the cameras of the above described type, such a phenomenon may undesirably take place that in the case where a printing zone narrower than an ordinary printing zone has been designated at the time of photographing objects, data imprinted on the film are not printed on the printing paper.

The above described photographic camera systems have such a drawback that since the operating member for designating the printing zone and an imprinting means for imprinting, in accordance with operational states of the operating member, on the film, data indicative of the printing zone are required to be provided in the camera body, production cost of the camera body is increased.

Furthermore, in the cameras for use in the above described photographic camera systems, when a light measuring angle of an optical system of a light measuring device for measuring, for exposure control, brightness of the object is set at an angle of view corresponding to the ordinary printing zone, such a phenomenon may occur that in the case where the printing zone narrower than the ordinary printing zone is designated, even a zone which is not reproduced in the print is subjected to light measurement for exposure control, thereby resulting in improper exposure of the film. On the contrary, when the light measuring angle is set an angle of view corresponding to the designated printing zone narrower than the ordinary printing zone, spot light measurement and average light measurement are performed in the case where the ordinary printing zone and the printing zone narrower than the ordinary printing zone are designated, respectively. Hence, light measuring methods vary according to area of the designated printing zone. For example, if an object of extremely high brightness exists between an angle of view corresponding to a case in which the ordinary printing zone is designated (referred to as a "real focal length photographing mode") and an angle of view corresponding to a case in which the printing zone narrower than the ordinary printing zone is designated (referred to as a "pseudo focal length photographing mode"), exposure control is performed, in the case where the light measuring angle of average light measurement is set at the angle of view corresponding to the real focal length photographing mode, on the basis of light measurement of even the object of high brightness which is not printed in the pseudo focal length photographing mode. As a result, the film is underexposed in the pseudo focal length photographing mode. On the other hand, in the case where the light measuring angle of average light measurement is set at an angle of view corresponding to the pseudo focal length photographing mode, the object of high brightness is printed but is not subjected to light measurement in the real focal length photographing mode, thereby resulting in overexposure of the film in the real focal length photographing mode.

Moreover, in the cameras for use in the above described photographic camera systems, it is so arranged that not only the operating member is displaced but size of the frame of field of view in the viewfinder varies upon operation of the operating member such that the printing portion can be confirmed through the viewfinder. However, in such arrangement, it is impossible to determine from external appearance of the camera whether the camera is set to the real focal length photographing mode or the pseudo focal length photographing mode. Thus, there is such a possibility that a user of the camera is incapable of determining from external appearance of the camera whether the camera is set to the real focal length photographing mode or the pseudo focal length photographing mode with the result that the user photographs an object in one mode other than that expected by the user.

Meanwhile, in the cameras for use in the photographic camera systems, in the case where the pseudo focal length photographing mode for printing the narrower zone has been selected, incoming light is incident upon even a zone other than the printing zone. Such incoming light is essentially unnecessary and rather, may deteriorate image quality due to its reflection in the light shielding barrel or lens barrel.

SUMMARY OF THE INVENTION

Accordingly an essential object of the present invention is to provide a camera which is capable of recording data such as date in a printing zone in both a real focal length photographing mode and a pseudo focal length photographing mode.

Another object of the present invention is to provide a camera accessory which enables changeover of a camera between the real focal length photographing mode and the pseudo focal length photographing mode without incurring rise of production cost of the camera body.

Still another object of the present invention is to provide a camera in which proper exposure is performed at all times in both the real focal length photographing mode and the pseudo focal length photographing mode.

A further object of the present invention is to provide a camera in which whether the camera is set to the real focal length photographing mode or the pseudo focal length photographing mode can be determined easily.

A still further object of the present invention is to provide a camera which is capable of preventing deterioration of image quality due to light incident upon a zone outside a zone to be printed in the pseudo focal length photographing mode.

In order to accomplish these objects of the present invention, a photographic camera system according to one preferred embodiment of the present invention comprises: a mode setting means for selectively setting said photographic camera system to a real focal length photographing mode for printing an ordinary photographic zone and a pseudo focal length photographing mode for printing a zone narrower than the ordinary photographic zone; a recording means for recording on a film information corresponding to a set one of the real focal length photographing mode and the pseudo focal length photographing mode; a data imprinting means for selectively imprinting data such as date at one of a plurality of different positions on a photographing portion of the film; and a selector means for selecting said one of a plurality of the different positions in accordance with the set one of the real focal length photographing mode and the pseudo focal length photographing mode.

BRIEF DESCRIPTION OF THE DRAWINGS

These objects and features of the present invention will become apparent from the following description taken in conjunction with the preferred embodiments thereof with reference to the accompanying drawings, in which:

FIG. 21 is a schematic view of a control unit of the film printer of FIG. 20;

Before the description of the present invention proceeds, it is to be noted that like parts are designated by like reference numerals throughout several views of the accompanying drawings.

DETAILED DESCRIPTION OF THE INVENTION

Figure 1:
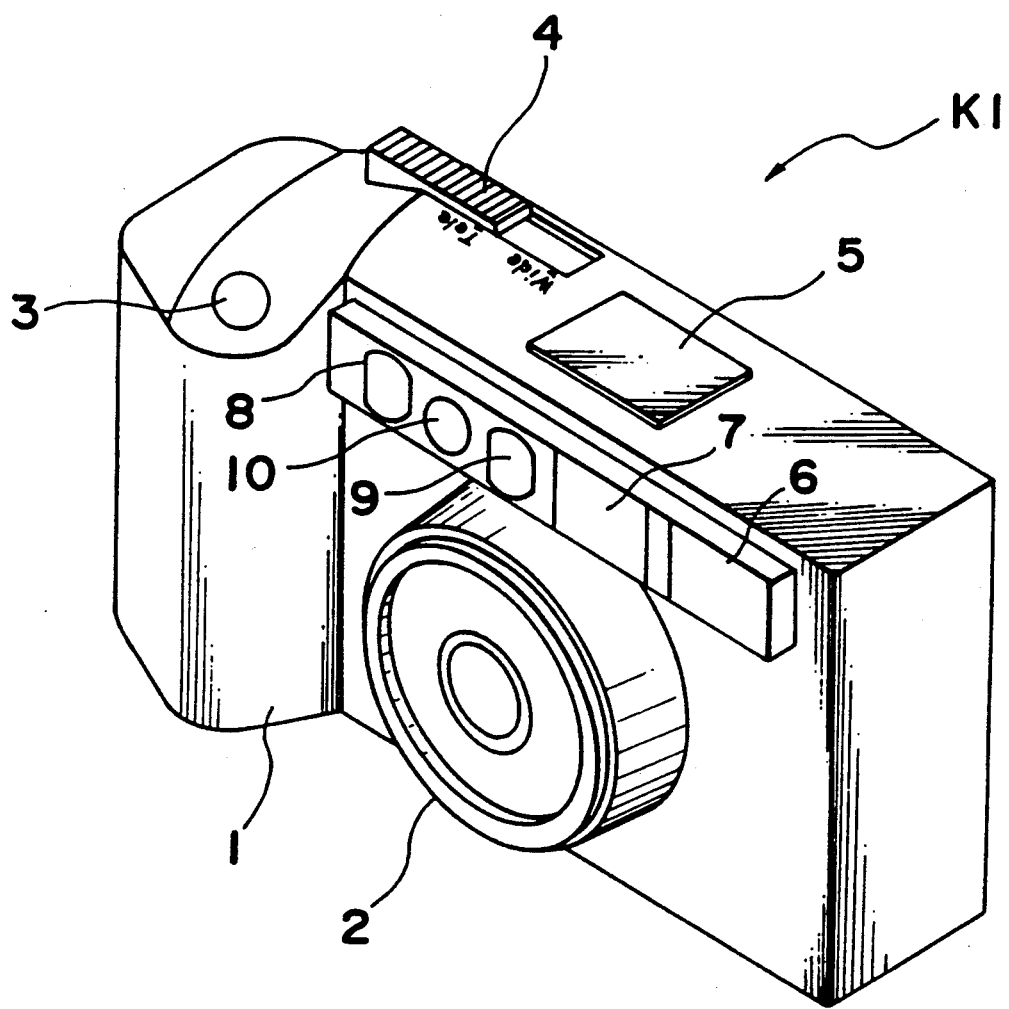
FIG 1 is a perspective view of a camera provided with a data imprinting device, according to a first embodiment of the present invention.
Figure 2:
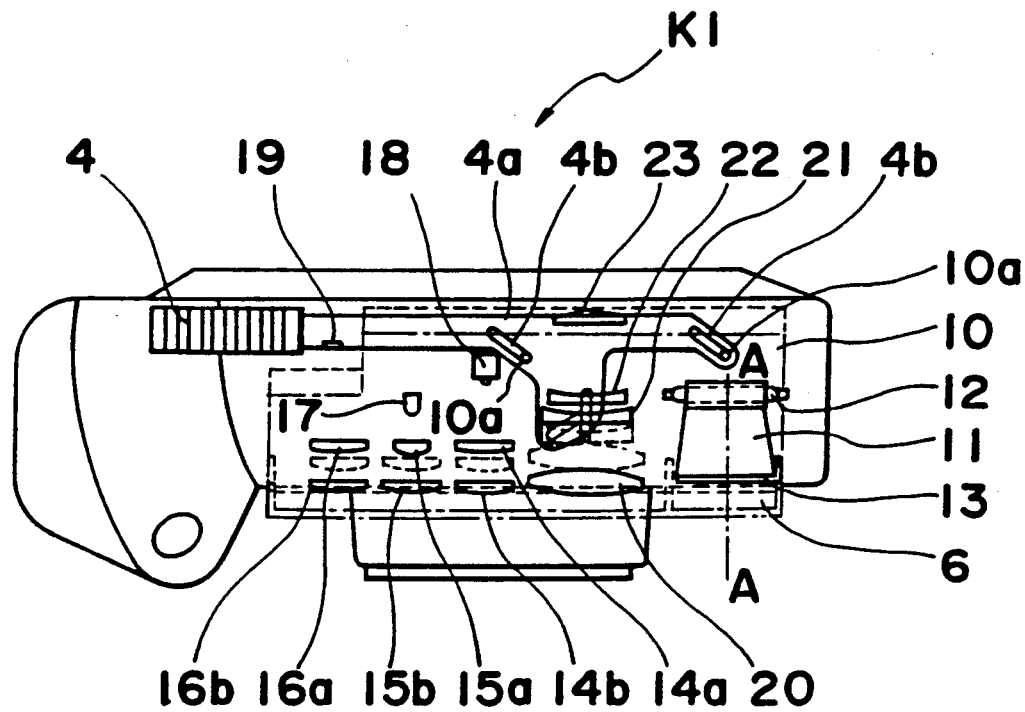
FIG. 2 is a top plan view of the camera of FIG. 1.
Figure 3:
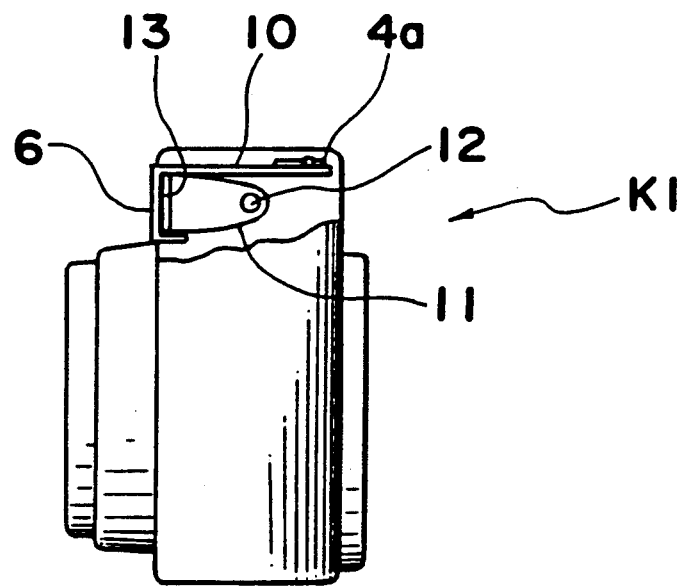
FIG. 3 is a side elevational view of the camera of FIG. 1.

Initially, construction of a camera K1 according to a first embodiment of the present invention will be described with reference to FIGS. 1 to 10, hereinbelow. As shown in FIGS. 1 to 3, the camera K1 includes a camera body 1, an objective lens 2, a shutter release button 3, a trimming lever 4, a liquid crystal display panel 5, a flash light emitting panel 6, a viewfinder window 7, distance measuring windows 8 and 9 and a light receiving window 10 of an automatic exposure control means (referred to as an "AE", hereinbelow).

FIG. 2 shows changeover of the camera K1 between wide angle (standard) photography (indicated by a mark "Wide" in FIG. 1) and telephotography (indicated by a mark "Tele" in FIG. 1) through trimming upon operation of the trimming lever 4. When the trimming lever 4 is displaced towards the mark "Wide", i.e. rightwards in FIG. 2, a cam plate 4a is also displaced rightwards in FIG. 2, so that a retainer plate 10 for a changeover optical system is displaced upwardly in FIG. 2 through a pin 10a engaged with a groove 9b of the cam plate 4a and thus, the camera K1 is changed over to the wide angle (standard) position shown by the broken lines in FIG. 2. In FIG. 2, reference numerals 14a and 14b denote projection lenses for an automatic focus detecting means (referred to as an "AF", hereinbelow) and reference numerals 15a and 15b denote light receiving lenses for the AE and reference numerals 16a and 16b denote light receiving lenses for the AF. The projection lens 14a, the light receiving lenses 15a and 16a are fixed in position, while the projection lens 14b and the light receiving lenses 15b and 16b are displaced forwardly and rearwardly in the camera K1 by the retainer plate 10. In the above described arrangement of the camera K1, when the trimming lever 4 is changed over to the mark "Tele", a range illuminated by incident light for the AF is decreased and a combined focal length of the light receiving lenses 16a and 16b for the AF is increased such that accuracy of distance measurement is raised. At the same time, a combined focal length of the light receiving lenses 15a and 15b for the AE is also increased such that a light measuring range is decreased in conformity with a trimming zone. When the trimming lever 4 is changed over to the mark "Tele", a viewfinder lens 20 is displaced downwardly in FIG. 2 and a viewfinder lens 21 is displaced upwardly in FIG. 2, so that a magnification of the viewfinder is increased and a zone to be printed upon the pseudo focal length photographing mode is indicated by a viewfinder frame.

Meanwhile, reference numeral 22 denotes a frame reflecting mirror lens, reference numeral 23 denotes an eyepiece, reference numeral 17 denotes a photo detector for the AE, reference numeral 18 denotes a light emitting element for the AF and reference numeral 19 denotes a photo detector for the AF. The flash light emitting device is constituted by a reflecting bevel 11, a xenon light emitting tube 12 and a movable panel 13 and functions as a zoom strobe whose angle of illumination changes upon operation of the trimming lever 4.

Figure 4:
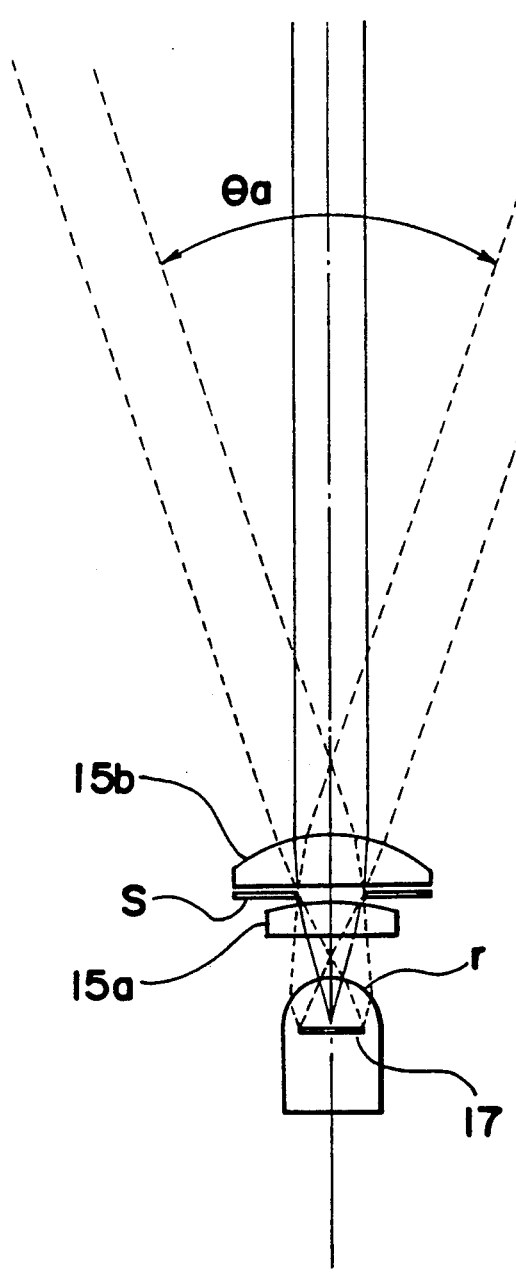
FIGS. 4 and 5 are views indicative of a light measuring optical system employed in the camera of FIG. 1 in a real focal length photographing mode and a pseudo focal length photographing mode, respectively.
Figure 5:
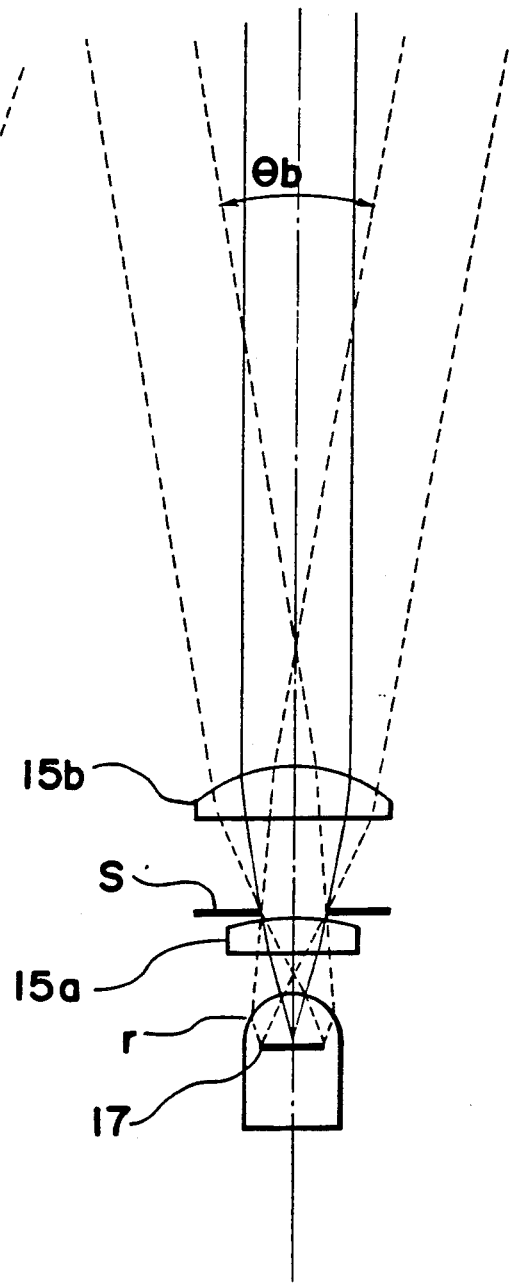

Referring to FIGS. 4 and 5, there is shown a light measuring optical system employed in the camera K1. The light measuring optical system includes a light measuring photo detector 17, a lens 15a fixed to the camera body, an aperture S disposed forwardly of the lens 15a and a lens 15b. The light measuring photo detector 17 is formed by a silicon photo diode and its package has a side face r acting as a lens face having a positive refracting power. FIG. 4 shows positions of the lenses 15a and 15b in a real focal length photographing mode for designating an ordinary printing zone, while FIG. 5 shows positions of the lenses 15a and 15b in a pseudo focal length photographing mode for designating a printing zone narrower than the ordinary printing zone, respectively. As will been seen from FIGS. 4 and 5, upon changeover of the camera K1 from the real focal length photographing mode to the pseudo focal length photographing mode, only the lens 15b is displaced forwardly in the direction of the optical axis of the camera K1 such that a distance between the lenses 15a and 15b is increased. Therefore, assuming that a light measuring angle in the real focal length photographing mode of FIG. 4 is represented by $\theta a$ and a light measuring angle in the pseudo focal length photographing mode of FIG. 5 is represented by $\theta b$, $\theta a > \theta b$.

More specifically, initially supposing that reference character ft denotes a combined focal length of the light measuring optical system by neglecting the refracting power of the lens face r of the package of the light measuring photo detector 17 and reference characters f1 and f2 denote focal lengths of the lenses 15a and 15b, respectively, the combined focal length ft is given by the following equation (1):

$$1/ft = (1/f1) + (1/F2) - (e/f1 \cdot f2) \tag{1}$$

where reference character e denotes a distance between the lenses 15a and 15b. As will be understood from the equation (1), value of the right side of the equation (1) decreases when the distance e is increased on the assumption that both of the focal lengths f1 and f2 are positive. Hence, the combined focal length ft of the light measuring optical system increases. When the combined focal length ft of the light measuring optical system is increased, a light measuring angle of the light measuring optical system decreases and thus, it becomes possible to decrease the light measuring angle of the light measuring optical system by increasing the distance e between the lenses 15a and 15b. To this end, in the camera K1, the lens 15b disposed more adjacent to an object to be photographed than the lens 15a is displaced in the direction of the optical axis so as to change the distance e between the lenses 15a and 15b such that the light measuring angle of the light measuring optical system is changed. Namely, in the camera K1, the distance between the lenses 15a and 15b is decreased in the real focal length photographing mode as shown in FIG. 4 such that the light measuring angle of the light measuring optical system is set at the relatively wide angle $\theta a$, while the distance between the lenses 15a and 15b is increased in the pseudo focal length photographing mode as shown in FIG. 5 such that the light measuring angle of the light measuring optical system is set at the narrow angle $\theta b$ corresponding to the narrow printing zone printed in the pseudo focal length photographing mode. The light measuring photo detector 17 is arranged to perform average light measurement of light incident from within the light measuring angle.

Figure 6:
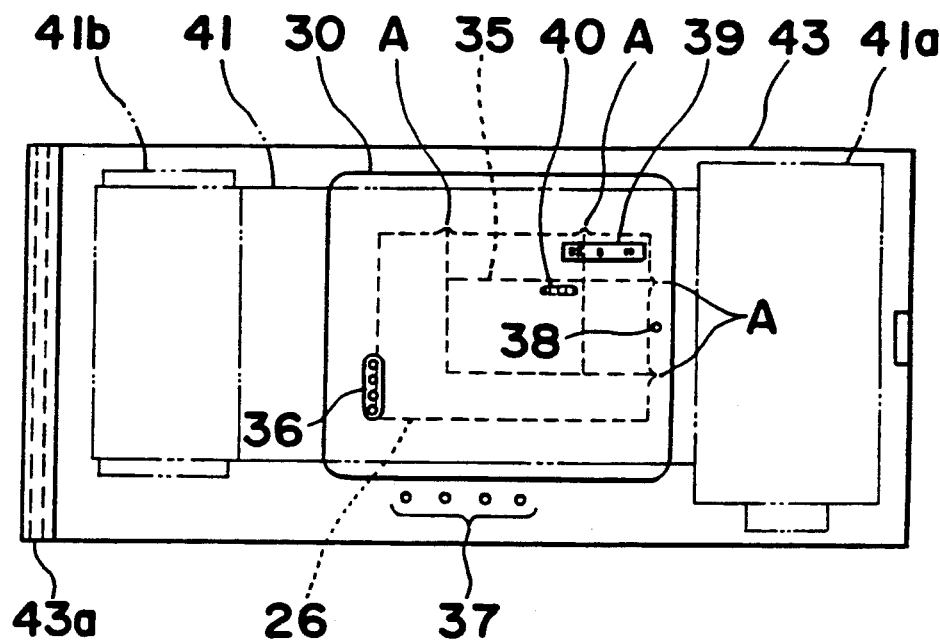
FIG. 6 is a front elevational view of an inside of a back cover employed in the camera of FIG. 1.

Meanwhile, FIG. 6 shows an inside of a back cover 43 of the camera K1. The back cover 43 includes terminals 37 for receiving signals from the camera body, a print number imprinting portion 36 for imprinting the number of prints on the film, a trimming data imprinting portion 38 for imprinting trimming data on the film and data imprinting portions 39 and 40 for imprinting on the film data such as dates. The terminals 37 include four terminals IP (imprint), TRD (trimming data), DIS (disable) and GND (ground) disposed at positions confronting terminals provided at the camera body. The print number imprinting portion 36 is provided so as to imprint, as a four-bit signal, a preset number of prints on the film upon depression cf a push-button switch 44 to be described later and are constituted by four light emitting diodes. The trimming data imprinting portion 38 is constituted by a single light emitting diode and is arranged to imprint a trimming mark 38a on the film in response to a trimming signal produced at the time when the trimming lever 4 is set to the mark "Tele". The data imprinting portion 39 is provided for imprinting data on the film when the trimming lever 4 is set to the mark "Wide", i.e. when the real focal length photographing mode is set. On the other hand, the data imprinting portion 40 is provided for imprinting data on the film when the trimming lever 4 is set to the mark "Tele", i.e. when the pseudo focal length photographing mode is set. In consideration of the fact that data of the data imprinting portion 40 are enlarged at a large magnification, size of the data of the data imprinting portion 40 is made smaller than that of the data imprinting portion 39.

Figure 7:
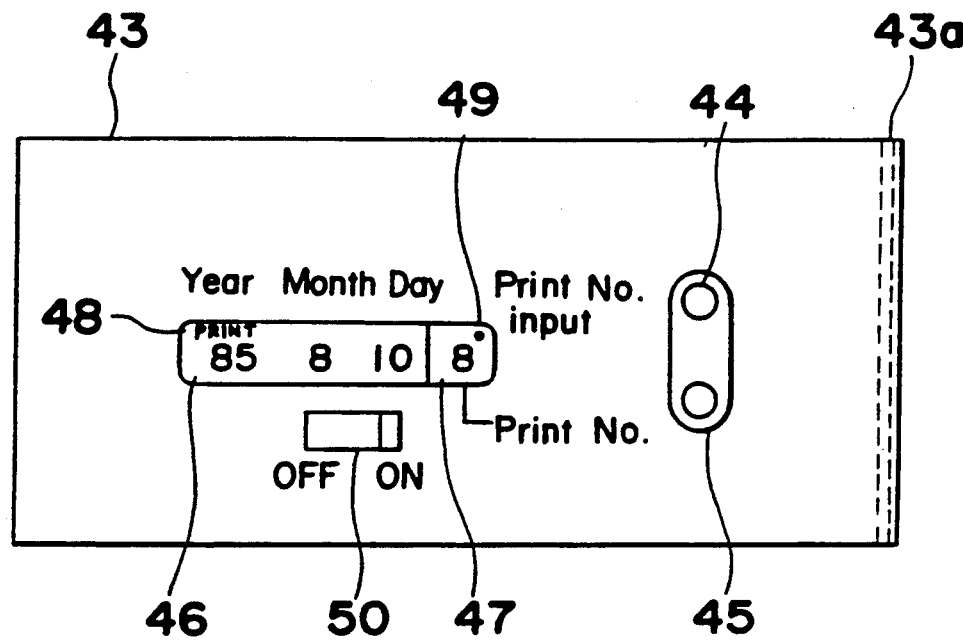
FIG. 7 is a front elevational view of an outside of the back cover of FIG. 6.

FIG. 7 shows an outside of the back cover 43. The back cover 43 includes the push-button switch 44 for imprinting the number of prints on the film, a push-button switch 45 for setting the number of prints and a display portion 47 for displaying the number of prints. By depressing the push-button switch 45 prior to photographing an object, prints to be made are set at a required number. Each time the push-button switch 45 is depressed once, numerals ranging from 0 to 8 are sequentially set in an increasing order so as to be displayed by the display portion 47. The numeral 0 appears again subsequently to the numeral 8. Then, by depressing the push-button switch 44, the set number of the prints is imprinted on the film as the four-bit signal. A mark 49 for indicating that the number of the prints has been imprinted on the film is provided at a portion of the display portion 47 and is displayed upon depression of the push-button switch 44. When a date imprinting mode switch 50 is turned on, dates are allowed to be imprinted on the film. Meanwhile, when the date imprinting mode switch 50 is turned off, dates are not allowed to be imprinted on the film. Reference numeral 46 denotes a date display portion for indicating a date to be imprinted.

Figure 8:
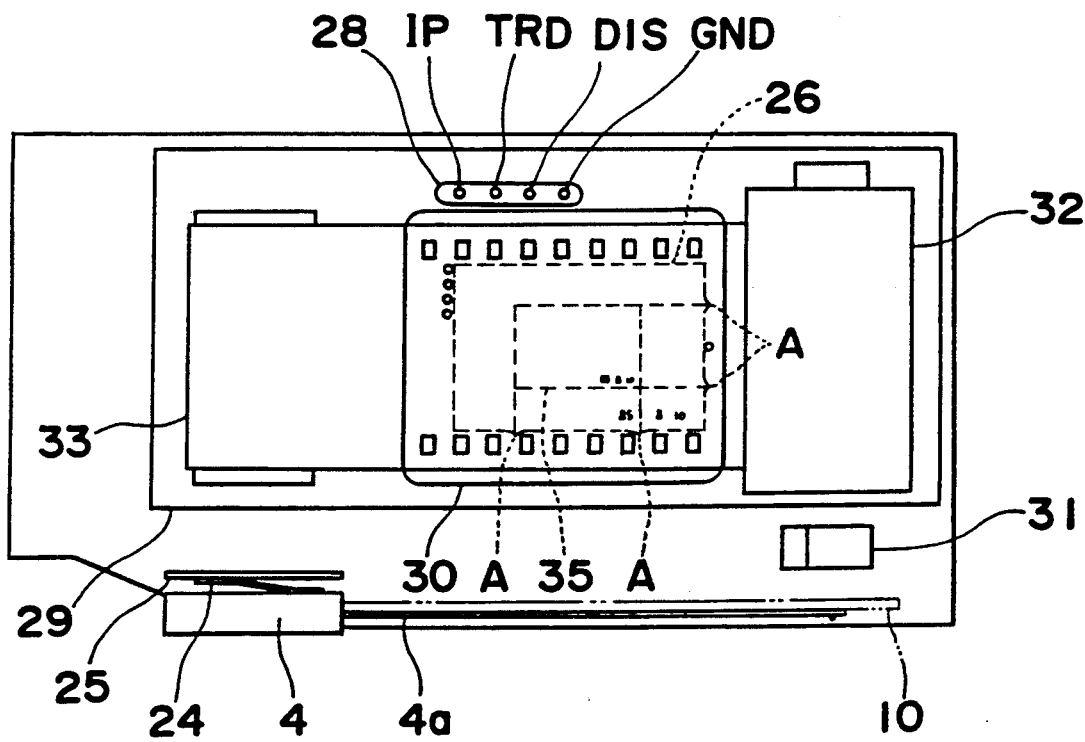
FIG. 8 is a rear elavational view of an inside of the camera of FIG. 1.

FIG. 8 shows an inside of the camera K1 as viewed from the back cover 43 by opening the back cover 43. In FIG. 8, reference numeral 29 denotes a position of the back cover 43. A trimming signal brush 24 and a trimming signal substrate 25, which are provided inside the trimming lever 4, constitute a slide switch. This slide switch is turned on when the trimming lever 4 is set to the mark "Tele" so as to transmit to a processor a signal indicative of whether the trimming lever 4 is set to the mark "Wide" or the mark "Tele". Reference numeral 26 denotes a photographing frame of an ordinary size of 24×36 mm provided in the camera body. In order to enable the user to confirm the printing zone on a negative film after photographing when an object is photographed by setting the trimming lever 4 to the mark "Tele", around the photographing frame 26, four recesses A are formed such that two of the recesses A is disposed at a right side of the photographing frame 26, with the remaining two of the recesses A being disposed on a bottom side of the frame 26. A zone designated by reference numeral 35 represents a printing zone when the pseudo focal length photographing mode is set. A terminal 28 is provided for delivering signals from the camera body to the back cover 43 and is constituted by four terminals IP (imprint), TRD (trimming data), DIS (disable) and GND (ground). Meanwhile, reference numeral 30 denotes a film pressing plate, reference numeral 31 denotes a flash switch lever, reference numeral 32 denotes a film cartridge and reference numeral 33 denotes a film take-up spool.

Figure 9:
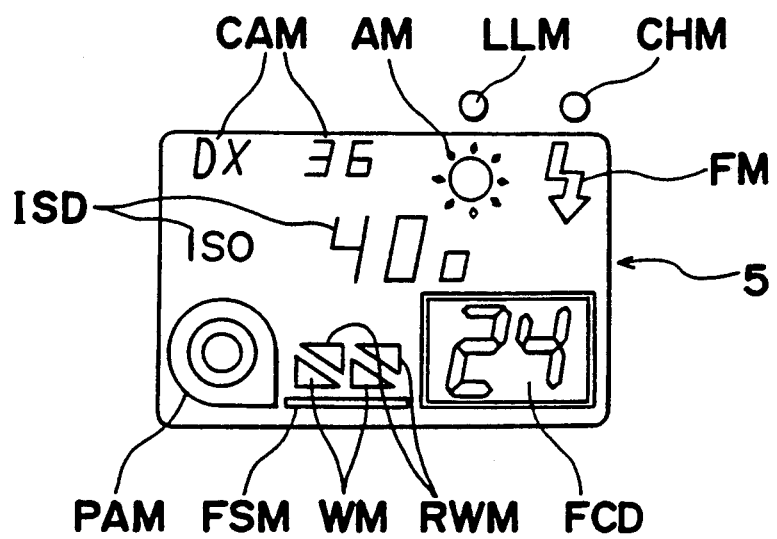
FIG. 9 is a front elevational view of a liquid crystal display portion, of the camera of FIG. 1.

FIG. 9 shows the liquid crystal display panel 5 provided on the upper face of the camera body. Firstly, on the liquid crystal display panel 5, the number CAM of photographable frames of the film is displayed by reading a CAS code on a DX film cartridge. When the CAS code is not present, display of the number CAM of photographable frames of the film is cancelled. Secondly, on the liquid crystal display panel 5, a film speed ISO indicative of a film speed based on ISO (International Organization for Standardization) is displayed by reading the CAS code on the DX film cartridge. In the case where the CAS code is not provided on the film cartridge, "ISO 100" is displayed. Thirdly, an indication that the film cartridge is loaded into the camera body is displayed. When the film cartridge is loaded into the camera body and then, the back cover 43 is closed, a mark "PAM" is displayed. Fourthly, displays of states of the film in the camera body include a display FSM that the film is being preliminarily fed, a display WM that the film is being wound and a display RWM that the film is being rewound are displayed. Fifthly, a natural light photographing mode AM and a flashlight photographing mode FM are displayed. Sixthly, the number FCD of the photographed frames of the film is displayed. Seventhly, when the film is underexposed due to dark field to be photographed, a warning LLM on a low shutter speed limit for underexposure and an indication CHM of completion of electric charging of the flash are displayed by blinks of light emitting diodes. These indications are displayed on the basis of signals processed in a microprocessor to be described later with the exception that the indication CHM of completion of electric charging of the flash is displayed on the basis of signals in a flash circuit.

Figure 10:
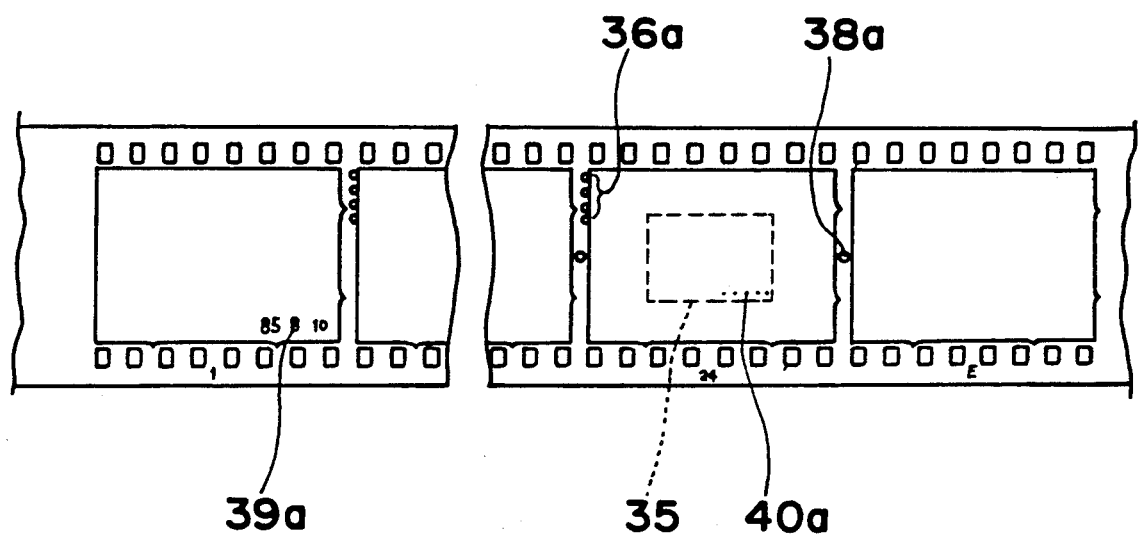
FIG. 10 is a front elevational view of a film photographed by the camera of FIG. 1.

FIG. 10 shows a film photographed by the camera K1. In FIG. 10, reference numeral 35 denotes a zone of an image plane to be printed when the pseudo focal length photographing mode is set. The trimming mark 38a is imprinted on the film by the trimming data imprinting portion 38 as described earlier with reference to FIG. 6. A print number code 36a indicative of the number of prints to be made is imprinted on the film by the print number imprinting portion 36. Data 39a such as dates are imprinted on the film by the data imprinting portion 39 when the real focal length photographing mode is set. Meanwhile, data 40a such as dates are imprinted on the film by the data imprinting portion 40 when the pseudo focal length photographing mode is set.

Figure 11:
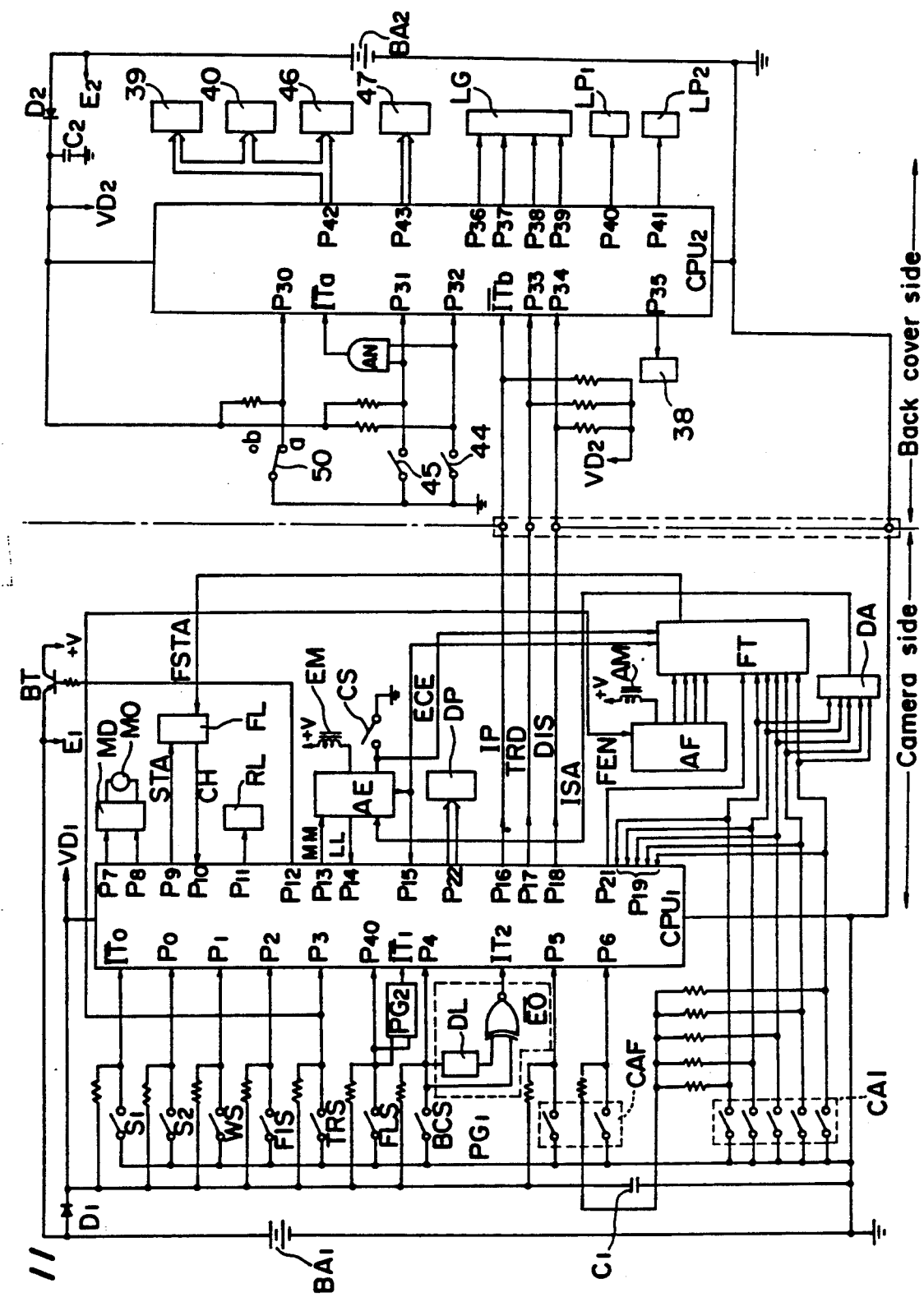
FIG. 11 is an electrical circuit diagram of the camera of FIG. 1.
Figure 12A:
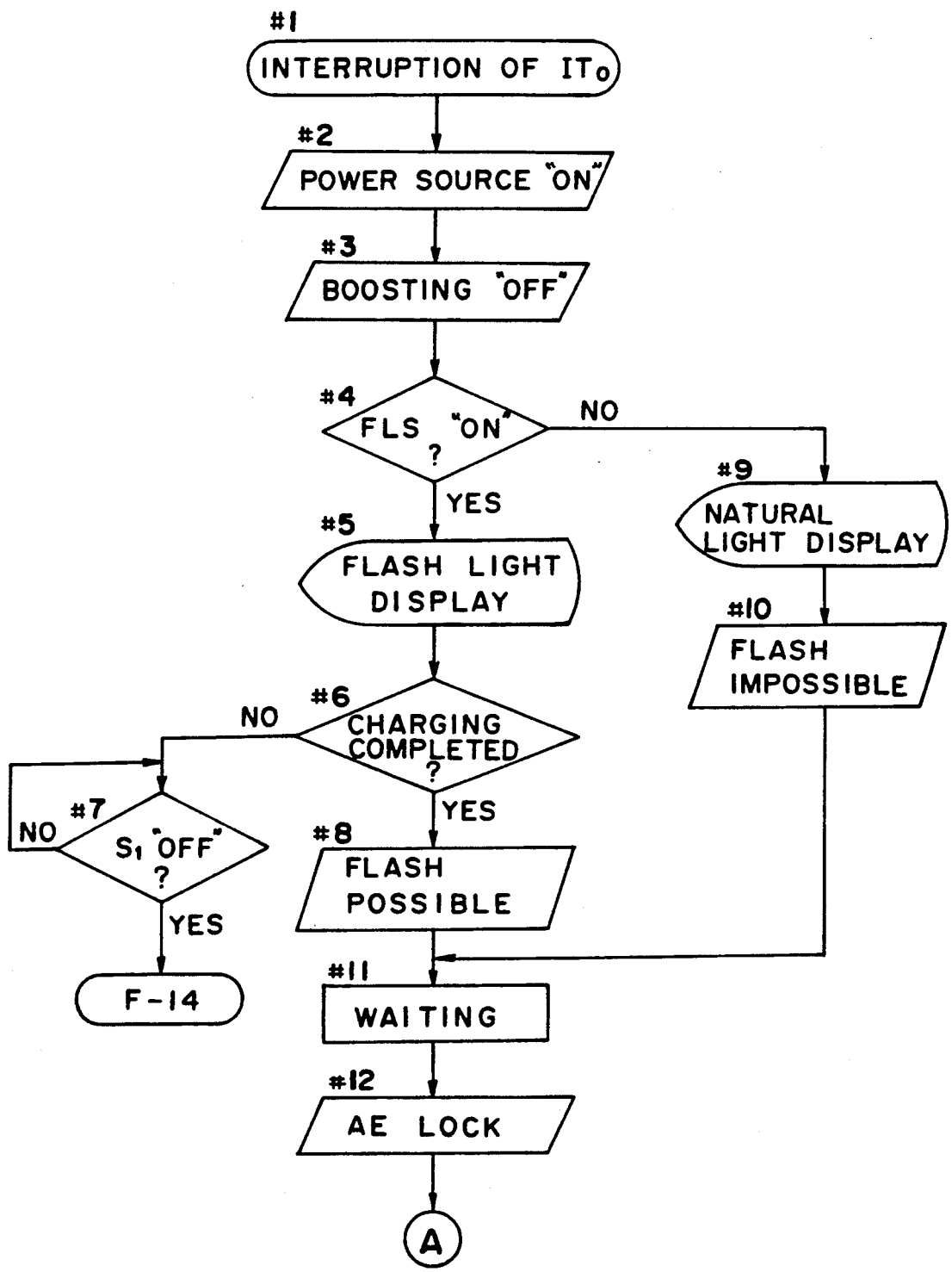
FIGS. 12A to 12E are flow charts showing a processing sequence of signals of exposure control and photographing in the camera of FIG. 1.
Figure 12B:
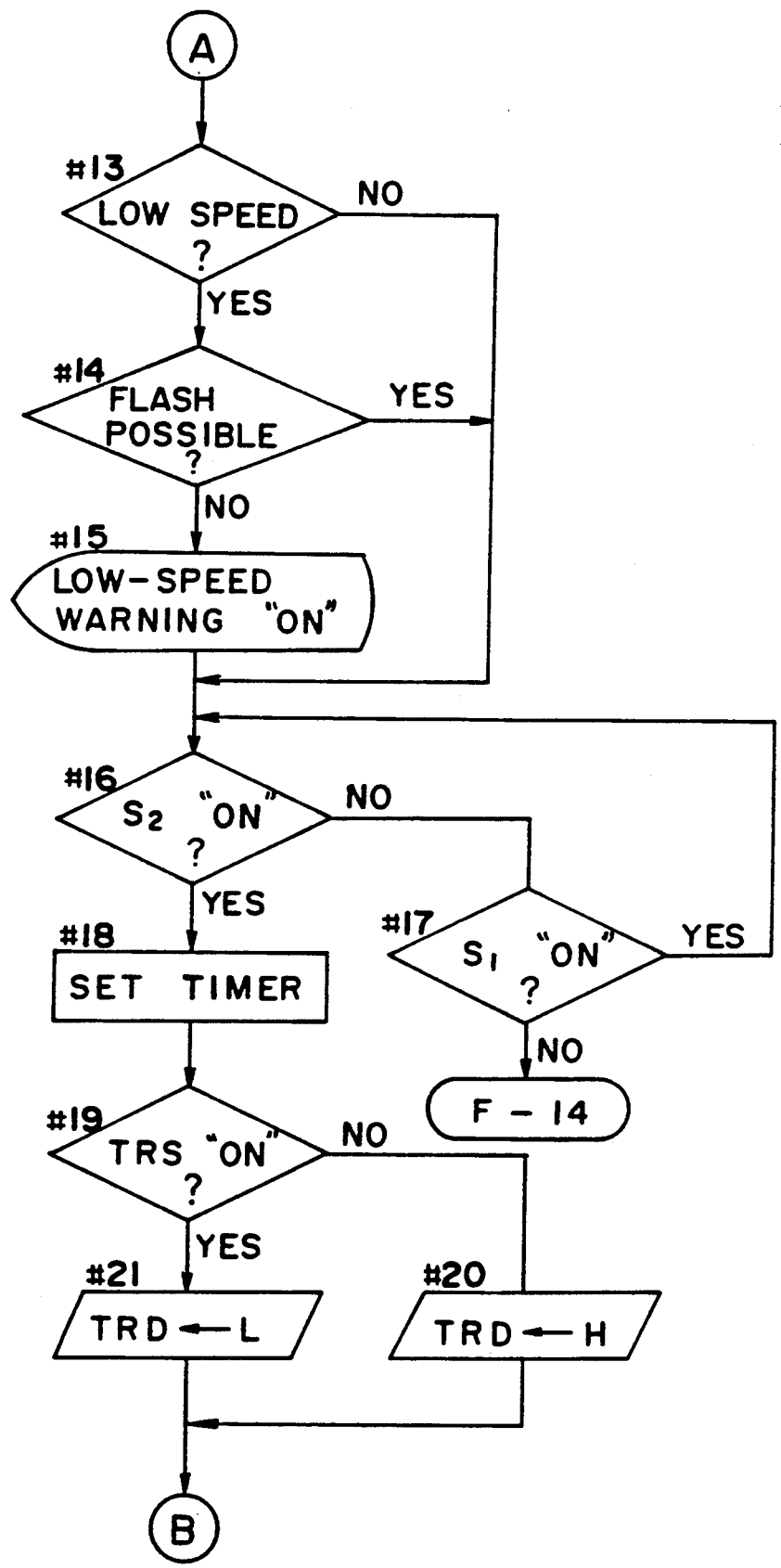
Figure 12C:
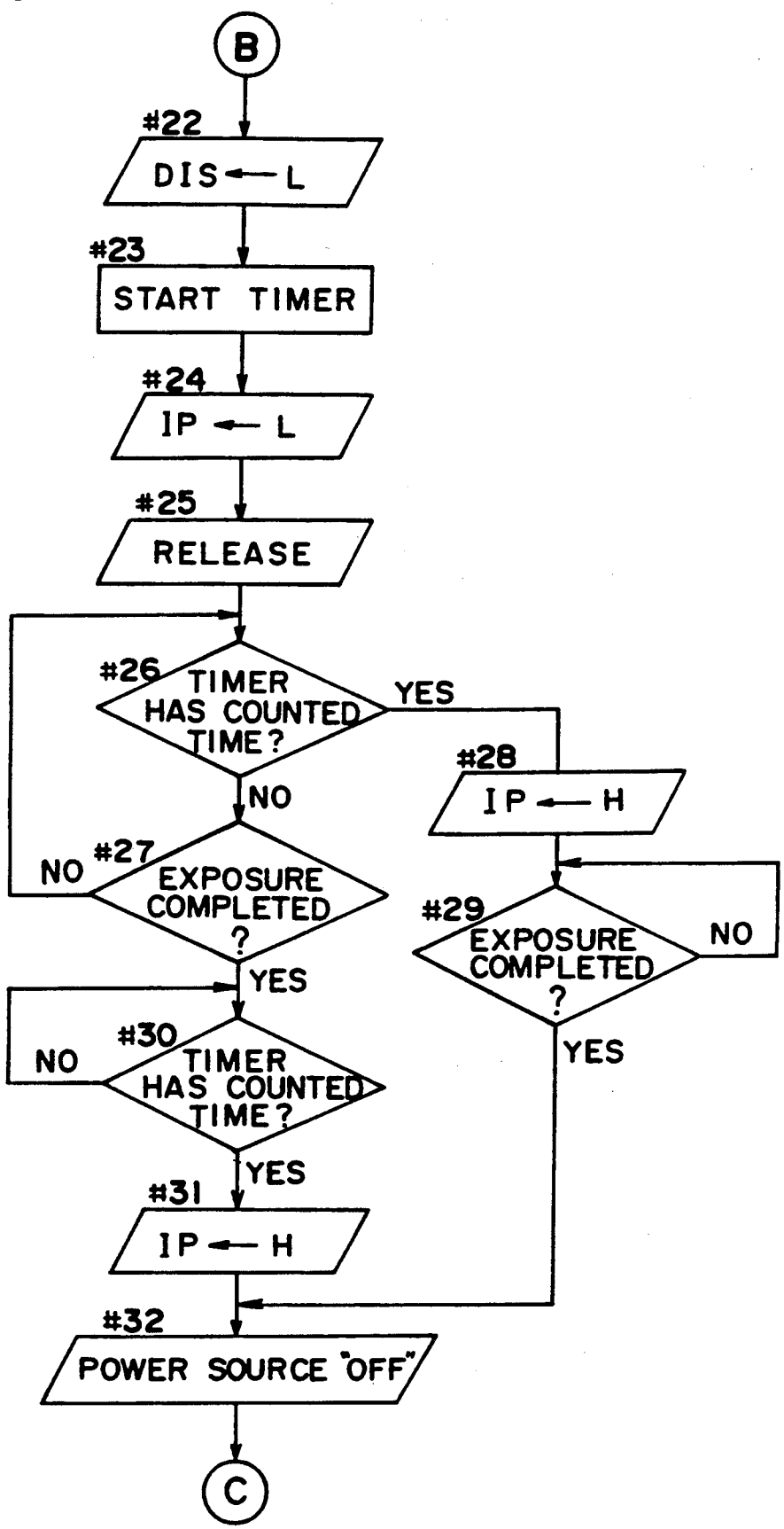
Figure 12D:
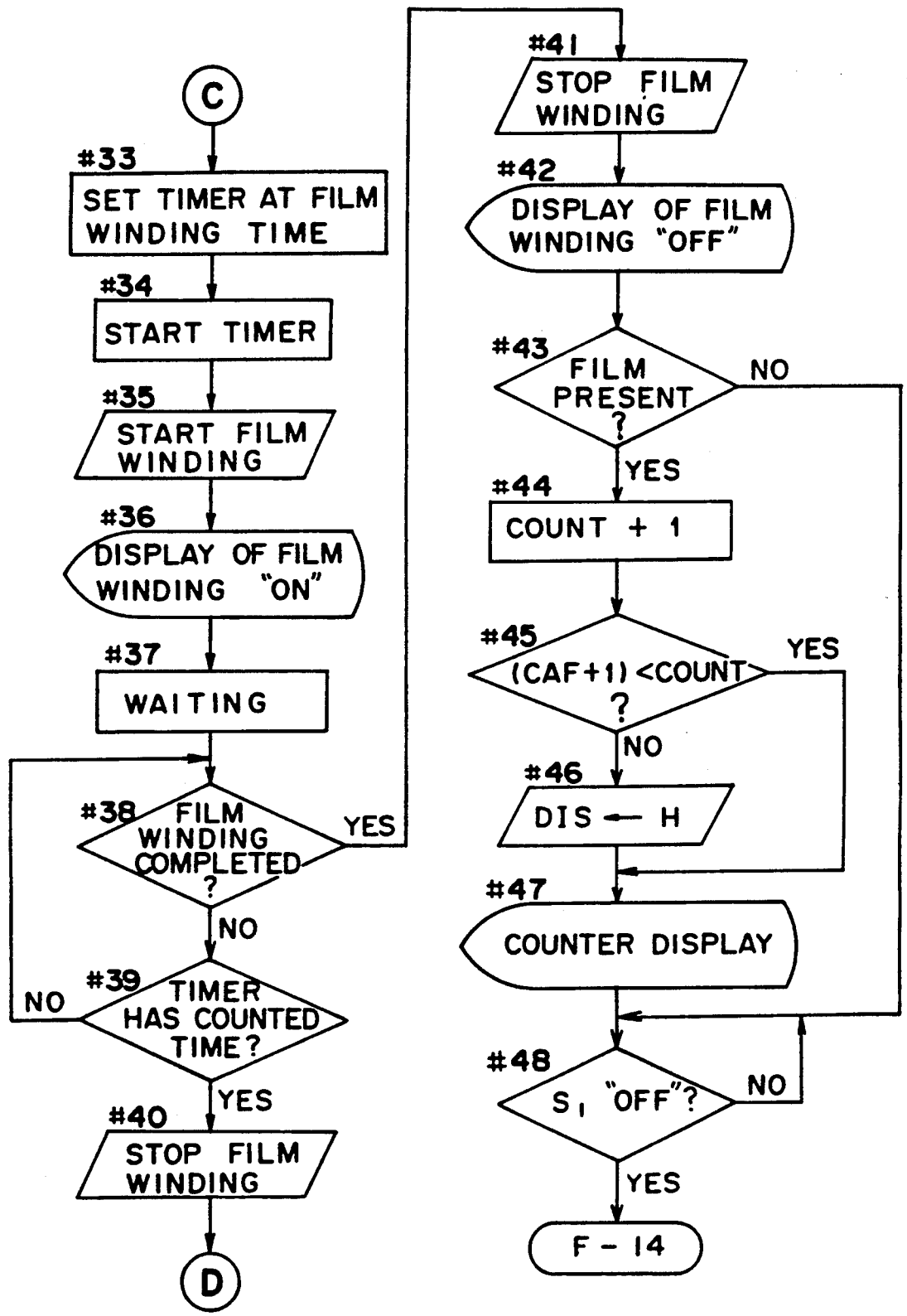
Figure 12E:
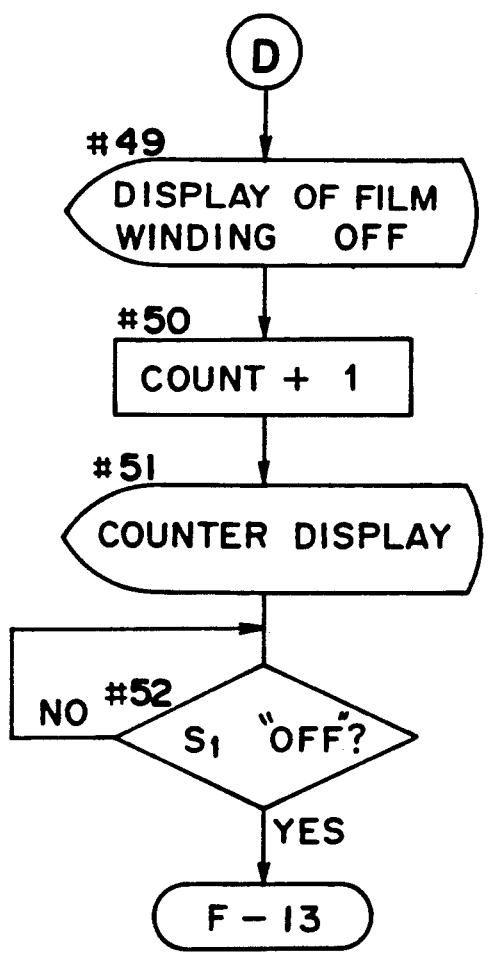

Then, an electric circuit of the camera K1 will be described with reference to FIG. 11. As indicated at the bottom portion of FIG. 11, the left and right side portions of FIG. 11 are, respectively, incorporated into the camera body and the back cover 43. Initially, a circuit portion in the camera body is described. Electric power supplied from a battery BA1 is applied to a first processor CPU1 and other components through a voltage stabilizing circuit constituted by a diode D1 and a capacitor C1 and is fed to the automatic exposure control circuit AE, the automatic focus detecting circuit AF, a digital-analog converter DA, a flash timer FT by way of a power source transistor BT actuated by signals from the first processor CPU1. Switches for transmitting operational states of the camera K1 to the first processor CPU1 include a light measuring switch S1 to be closed upon depression of the shutter release button 3 to the first stage, a release switch S2 to be closed upon depression of the shutter release button 3 to the second stage, a winding switch WS to be closed in response to detection of winding of one frame of the film, a detection switch FIS for detecting loading of the film into the camera body, a trimming switch TRS to be closed at the time when the trimming lever 4 is set to the mark "Tele", namely at the time when the pseudo focal length photographing mode is set, a switch FLS to be closed at the time of use of the flash device, a detection switch BCS for detecting opening and closing of the back cover 43, a switch CAF for reading from the CAS code on the film cartridge a code of the number of photographable frames of the film and a switch CAI for reading a film speed code from the CAS code. The detection switch FIS is closed when the film is not loaded into the camera body. Meanwhile, the detection switch BCS is turned on and off when the back cover 43 is closed and opened, respectively.

Output ports of these switches are connected to an interruption terminal $\overline{IT0}$ input ports P0, P1, P2, P3, P40, P4, P5, P6 and P19, respectively. Meanwhile, when the switch FLS and the detection switch BCS are turned off from the on state and are turned on from the off state, the switch FLS and the detection switch BCS deliver positive edge signals to input ports $\overline{IT1}$ and $\overline{IT2}$ through pulse generators PG2 and PG1 for interrupting the first processor CPU1, respectively so as to reset data given to the first processor CPU1. A film winding signal and a film rewinding signal are transmitted from output ports P7 and P8 of the first processor CPU1 so as to control a driving motor MO. When a start signal is transmitted from an output port P9 of the first processor CPU1 to a flash circuit FL, boosting and electric charging of the flash circuit FL are started. Upon completion of electric charging of the flash circuit FL, a signal CH is issued to an input port P10 of the first processor CPU1. The flash circuit FL is turned on in response to a flash start signal FSTA from the flash timer FT. A release control circuit RL is actuated by a positive edge signal from an output port P11 of the first processor CPU1 so as to release the shutter such that the automatic focus detecting circuit AF is released from locking. A signal for actuating the power source transistor BT is supplied from an output port P12 of the first processor CPU1.

In an exposure control circuit AE, when the power source is turned on, light measurement of field to be photographed is performed. When a signal MM for commanding storage of a light measurement value is delivered from an output port P13 of the first processor CPU1, an exposure value EV1 is fixed (hereinbelow, referred to as "AE lock"). The exposure value EV1 is determined in accordance with a light measurement value and the film speed obtained by converting the data of switch CAI to an analog signal by the digital-analog converter DA through a signal line ISA. Upon completion of focus detection by an automatic focus detecting circuit AF and completion of focus adjustment by the automatic focus detecting mechanism, the shutter is released so as to start opening. At this moment, a count switch for actuating a counter for counting pulses outputted from an encoder in response to displacement of the shutter is turned on. A count value EV2 of the counter, which represents amount of exposure after start of opening of the shutter, and the exposure value EV1 subjected to AE lock are compared with each other. When the count value EV2 and the exposure value EV1 coincide with each other, a shutter control magnet EM is turned off so as to close the shutter and, at the same time, a shutter closing signal ECE is transmitted to a port P15 of the first processor CPU1 and the flash timer FT. When the exposure value EV1 subjected to AE lock is smaller than a predetermined value, the film is underexposed and thus, a low-speed limit warning signal LL is delivered to a port P14 of the first processor CPU1. In this case, when the count value EV2 has reached a predetermined value, the shutter is forcibly closed even if the count value EV2 has not yet reached the exposure value EV1 subjected to AE lock.

In the automatic focus detecting circuit AF, when the power source is turned on, distance measurement is started. Thus, the automatic focus detecting circuit AF stores the distance measurement data and, at the same time, output the distance measurement data to the flash timer FT. When the automatic focus detecting mechanism is released from locking upon actuation of the release circuit RL, displacement of the lens is started and a travel distance of the lens is measured by using pulses. When the lens is displaced to an in-focus position upon coincidence of the travel distance of the lens measured by using pulses with the distance measurement data stored beforehand, a driving magnet AM is de-energized so as to prevent displacement of the lens such that the lens is stopped. Meanwhile, a signal indicative of real focal length photographing mode or pseudo focal length photographing mode is directly transmitted from the trimming switch TR to the automatic focus detecting circuit AF such that distance measurement calculation for decoding a measured value into a distance zone, which is performed in the automatic focus detecting circuit AF, is changed.

The digital-analog converter DA converts a film speed signal Sv based on the CAS code on the film cartridge into an analog signal so as to input the analog signal to the exposure control circuit AE. The flash timer FT calculates a flash starting time data for the flash circuit FL on the basis of the distance data from the automatic focus detecting circuit AF and the film speed signal Sv.

The flash timer FT transmits a flash starting signal FSTA to the flash circuit FL when a time period counted upon closing of a count switch CS simultaneously with start of opening of the shutter has coincided with the flash starting time data. Thus, when the shutter blades have been opened to a proper position for obtaining a necessary amount of exposure, the flash is turned on so as to give a proper amount of exposure.

When the camera K1 is not set to the flash rode, a "High" signal is outputted from a port P21 of the first processor CPU1 to the flash timer FT but the flash starting signal FSTA is not transmitted from the flash timer FT to the flash circuit FL. Meanwhile, when a shutter closing signal ECE has been transmitted from the exposure control circuit AE to the flash timer FT, for example, in the case of daylight synchronized flash photography although the shutter opening time period counted by the counter does not reach the flash starting time, the flash is forcibly turned on by the shutter closing signal ECE.

A pulse IP having a time interval corresponding to the film speed is delivered from an output port P16 of the first processor CPU1 upon start of operation of exposure control. A trimming data signal TRD is delivered from an output port P17 of the first processor CPU1 in the pseudo focal length photographing mode. A signal DIS for forbidding imprinting of the number of prints on the film is delivered from an output port P18 of the first processor CPU1. These three signals are transmitted to the back cover 43. Meanwhile, various display data are delivered from an output port P22 of the first processor CPU1 so as to be displayed by the display circuit DP including the display panel 5.

Then, a circuit portion in the back cover 43 is described. Electric power supplied from a battery BA2 is applied to a second processor CPU2 and other components through a voltage stabilizing circuit constituted by a diode D2 and a capacitor C2. An output signal of a date imprinting mode switch 50 is applied to an input port P30 of the second processor CPU2. A switch 45 for setting the number of prints outputs an on signal each time the switch 45 is depressed. The on signal to be inputted to a port P31 of the second processor CPU2 is counted by a counter in the second processor CPU2. Reference numeral 44 denotes a switch for imprinting the number of prints on the film and an output signal of the switch 44 is applied to a port P32 of the second processor CPU2. Furthermore, when both the switch 44 and the switch 45 have been turned on, the output signals of the switches 44 and 45 are inputted to a port ITa of the second processor CPU2 so as to interrupt the second processor CPU2. A light source 38 for imprinting the trimming mark on the film is actuated by a control signal delivered from a port P35 of the second processor CPU2. A light source LG for imprinting the number of prints on the film is actuated by four-bit signals delivered from ports 36 to 39 of the second processor CPU2. A light source LP1 for imprinting data on the film at the time when the real focal length photographing mode is set is controlled by a signal delivered from a port P40 of the second processor CPU2. Meanwhile, a light source LP2 for imprinting data on the film at the time when the pseudo focal length photographing mode is set is controlled by a signal delivered from a port P41 of the second processor CPU2. Reference numeral 47 denotes the display portion for displaying the number of prints and reference numeral 46 denotes the data display portion. Reference numeral 39 denotes a display portion for displaying data such as dates imprinted on the film when the real focal length photographing mode is set, while reference numeral 40 denotes a display portion for displaying data such as dates imprinted on the film when the pseudo focal length photographing mode is set. Data such as dates are displayed by the display portions 39 and 40 in response to an output signal delivered from a port P42 of the second processor CPU2.

Hereinbelow, processing of signals in the first and second processors CPU1 and CPU2 are described with reference to flow charts of FIGS. 12 to 18 and a time chart of FIG. 19. FIGS. 12A to 12E show a processing sequence of signals of exposure control and photographing in the first processor CPU1. Initially, when an interruption signal is inputted to the interruption terminal ITO upon turning on of the light measuring switch S1 at step #1, the power source transistor BT is actuated at step #2 such that electric power is supplied to necessary portions. Then, a signal for stopping boosting of the flash circuit FL is delivered to the flash circuit FL at step #3. This boosting for electric charging of the flash circuit FL is stopped because when electric charging of the flash circuit FL is started, the automatic exposure control circuit AE, the automatic focus detecting circuit AF, etc. may not function normally due to drop of voltage of the power source. If it is found that a flash switch FLS is in the on state at step #4, the flash photography display mark FM is displayed on the display panel 5 at step #5 and then, a decision is made as to whether or not electric charging of the flash circuit FL has been completed at step #6. If it is found that electric charging of the flash circuit FL has not been completed, the program does not proceed to a flow for exposure control by locking release of the shutter but a decision is made as to whether or not the light measuring switch S1 is in the off state at step #7. If the light measuring switch S1 is in the off state, the program flow proceeds to a flash photography display routine F-14 of FIG. 14. On the contrary, if the light measuring switch S1 is in the on state, the program flow is set in a waiting state until the light measuring switch S1 is turned off. Meanwhile, if electric charging of the flash circuit FL has been completed at step #6, the flash circuit FL can be turned on and thus, a flash control signal FEN given to the flash timer FT is set at the LOW level at step #8. If the flash switch FLS is not in the on state at step #4, the natural light photography display mark AM is displayed on the display panel 5 at step #9 and then, the flash control signal FEN is set at the HIGH level so as to prevent the flash circuit FL from being turned on.

Then, light measurement is performed. After a predetermined waiting time for allowing the light measuring circuit to become stable at step #11, AE lock is performed so as to store the light measuring data at step #12. From the light measuring data, a decision is made as to whether or not the shutter speed becomes low at step #13. If it is found that the shutter speed is low, a decision is made as to whether or not a state in which the flash circuit FL can be turned on, i.e. the flash control signal FEN is set at the LOW level exists at step #14. If such state does not exists, the warning LLM on the low shutter speed limit for underexposure blinks on the display panel 5 at step #15.

When preparations for photography have been completed as described above, a decision is made as to whether or not the release switch S2 is in the on state at step #16. If the release switch S2 is not in the on state, a decision is made as to whether or not the light measuring switch S1 is in the on state at step #17. If the light measuring switch S1 is in the on state, a decision is again made as to whether or not the release switch S2 is in the on state at step #16. If the light measuring switch S1 is not in the on state, the shutter release button 3 is released and thus, the program flow proceeds to the flash photography display routine F-14 of FIG.14. If he release switch S2 is in the on state, the timer is set at a time period for imprinting data on the film at step #18, corresponding to the film speed. Then, a decision is made as to whether or not the trimming switch TRS is in the on state at step #19. If the trimming switch TRS is in the on state, a LOW level trimming data TRD is produced at step #21. Meanwhile, when the trimming switch TRS is not in the on state, a HIGH level trimming data TRD is produced at step #20. Subsequently, in order to forbid imprinting and setting of the number of prints through operation of the switches on the back lid 43 during a time period from start of operation of exposure control to completion of winding of the film, a LOW level signal DIS for forbidding imprinting of the number of prints on the film is produced at step #22. Then, an imprinting timer for setting an imprinting time is started at step #23 and an imprinting signal IP for imprinting data on the film is set at the LOW level so as to start imprinting of data on the film at step #24. Thereafter, the release control circuit RL is actuated so as to start control of the lens at step #25. Then, a decision as to whether or not the imprinting timer has completed its time counting at step #26 and a decision as to whether or not exposure of the film has been completed in response to an exposure completion signal from the automatic exposure control portion AE at step #27 are made alternately. If the imprinting timer has completed its time counting, the imprinting signal IP is set at the HIGH level so as to terminate imprinting of data on the film at step #28 or step #31. If it is found that the imprinting timer has completed its time counting and exposure of the film has been completed at step #29, the power source transistor BT is turned off at step #32 and thus, photographing operations have been completed.

Then, the film is wound. A frame winding timer is set at a maximum time period necessary for winding one frame of the film at step #33. Subsequently, the frame winding timer is started at step #34 and winding of the film is started at step #35. The display WM indicating that the film is being wound is blinked on the display panel 5 at step #36. After waiting for a predetermined time period at step #37 during which a frame switch for detecting feed of frames of the film is turned off from the on state, winding of the film is stopped at step #41 if a signal indicative of completion of winding of one frame of the film is produced by the frame switch at step #38 prior to completion of time counting of the frame winding timer of step #39. Then, the display WM indicating that the film is being wound is turned off at step #42. If it is found from the detection switch FIS for detecting loading of the film into the camera body that the film is loaded into the camera body at step #43, one is added to a count of a frame counter at step #44. Thereafter, if it is found that the count of the frame counter is not more than a sum of one and the number CAF of photographable frames of the film at step #45, the signal DIS for forbidding imprinting of the number of prints on the film is set at the HIGH level so as to be inoperative at step #46 and then, the count of the frame counter is displayed on the display panel 5 at step #47. On the other hand, if the count of the frame counter becomes greater than a sum of one and the number CAF of photographable frames of the film at step #45, the count of the frame counter is displayed on the display panel 5 at step #47 while setting and imprinting of the number of prints are being forbidden and then, a decision is made as to whether or not the light measuring switch S1 is in the off state at step #48. If the light measuring switch S1 is in the off state, the program flow proceeds to the flash photography display routine F-14 of FIG. 14.

Meanwhile, when the frame winding timer has completed its time counting without completion of winding of one frame of the film prior to lapse of the preset time period of the frame winding timer at step #39, the film cannot be advanced any more after photographing of the last frame of the film. Thus, winding of the film is stopped at step #40 and then, the display WM indicating that the film is being wound is turned off at step #49. Subsequently, the count of the frame counter is advanced by one at step #50 and then, is displayed on the display panel 5 at step #51. Then, after waiting until the light measuring switch SW1 is turned off at step #52, the program flow proceeds to a rewinding routine F-13 of FIG. 13.

Figure 13:
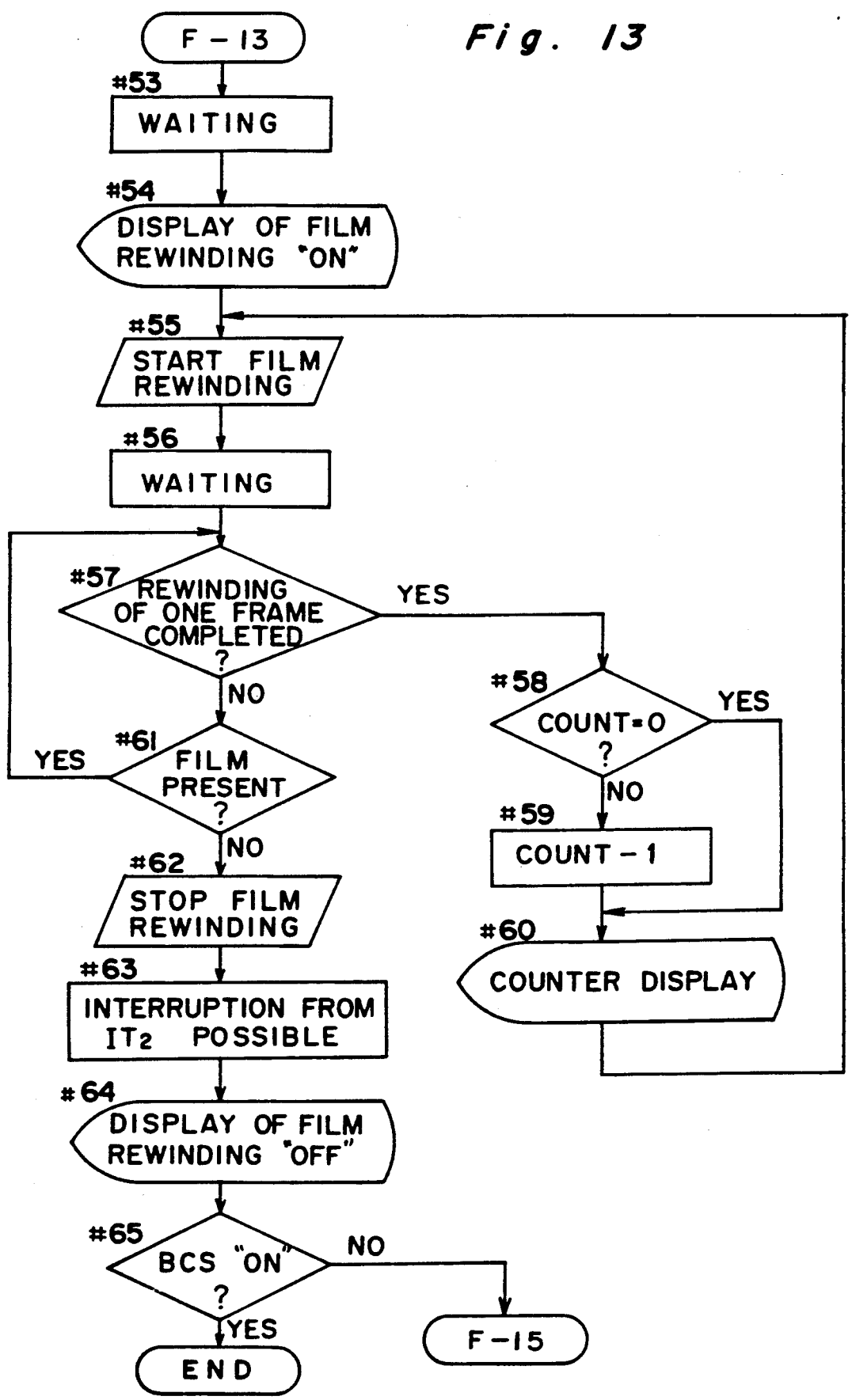
FIG. 13 is a flow chart showing a processing sequence of film rewinding operation in the camera of FIG. 1.

FIG. 13 shows the rewinding routine. Initially, after waiting for a predetermined time period at step #53, the display RWM indicating that the film is being rewound is blinked on the display panel 5 at step #54 so as to start rewinding of the film at step #55. After waiting until the frame switch is turned off in the case where the frame switch is in the on state at step #56, a decision is made as to whether or not rewinding of one frame of the film has been completed at step #57. If rewinding of one frame of the film has been completed, one is reduced from the count of the frame counter at step #59 and then, the count of the frame counter is displayed on the display panel 5 at step #60 such that the program flow returns to rewinding of the film again. Meanwhile, when rewinding of one frame of the film has not been completed, a decision is made by using the detection switch FIS as to whether or not the film is present in the camera body at step #61. If the film is present in the camera body, the program flow is set in a waiting state until rewinding of one frame of the film is completed. On the contrary, if the film is not present in the camera body at step #61, rewinding of the film is stopped at step #62 and interruption through opening and closing of the back lid 43 is allowed at step #63. Then, after the display RWM indicating that the film is being rewound is turned off at step #64, a decision is made as to whether or not the detection switch BCS for detecting opening and closing of the back cover 43 is in the on state. If the detection switch BCS is in the on state, the program flow stops. Meanwhile, if the detection switch BCS is not in the on state, the back cover 43 is opened and thus, the program flow proceeds to a display routine F-15 of FIG. 15.

Figure 14:
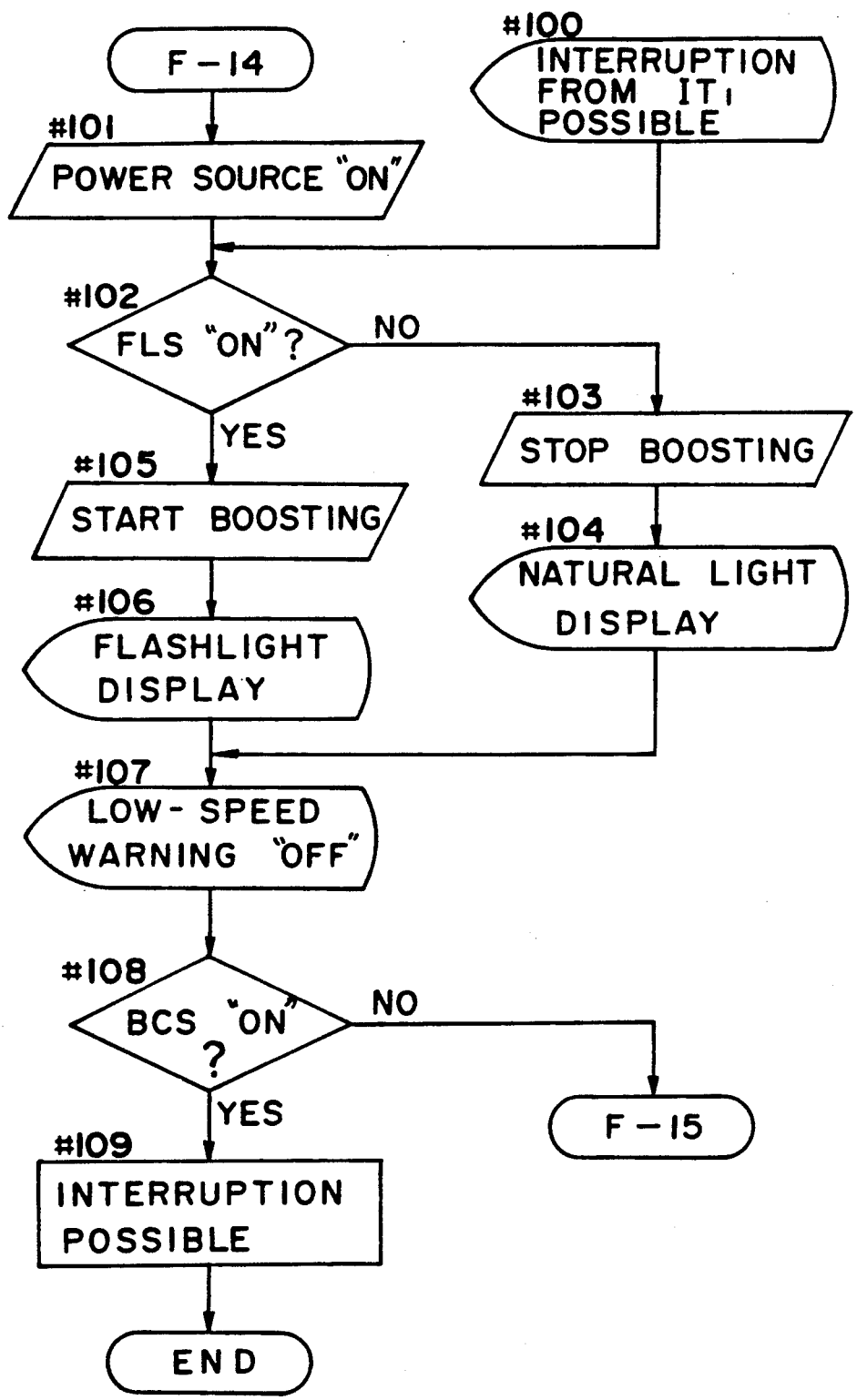
FIG. 14 is a flow chart showing a processing sequence of flash photography display in the camera of FIG. 1.

FIG. 14 shows the flash photography display routine. Initially, after the power source is turned on at step #101, a decision is made as to whether or not the flash switch FLS is in the on state at step #102. If the flash switch FLS is not in the on state, boosting of the power source of the flash circuit FL is stopped at step #103 and then, the natural light photographing mode AM is displayed on the display panel 5 at step #104. On the other hand, if the flash switch FLS is in the on state at step #102, the power source of the flash circuit FL is boosted at step #105 and then, the flashlight photographing mode FM is displayed at step #106. Then, after the warning LLM on the flow shutter speed limit for underexposure is turned off at step #107, a decision is made as to whether or not the detection switch BCS for detecting opening and closing of the back lid is in the on state at step #108. If the detection switch BCS is in the on state, interruption is allowed at step #109 and then, the program flow stops. If the detection switch BCS is not in the on state, the program flow proceeds to the display routine F-15 of FIG. 15.

Meanwhile, the routine of FIG. 14 is also a photographing mode changeover routine. Thus, if pulses of the pulse generator PG2 are inputted to the interruption terminal $\overline{IT1}$ upon changeover of the flash switch FLS between the on state and the off state, the routine of FIG. 14 is executed from step #100. As described above, a decision is made as to whether or not the flash switch FLS is in the on state in this routine such that the photographing mode of the camera K1 is changed over to the flashlight photographing mode or the natural light photographing mode.

Figure 15A:
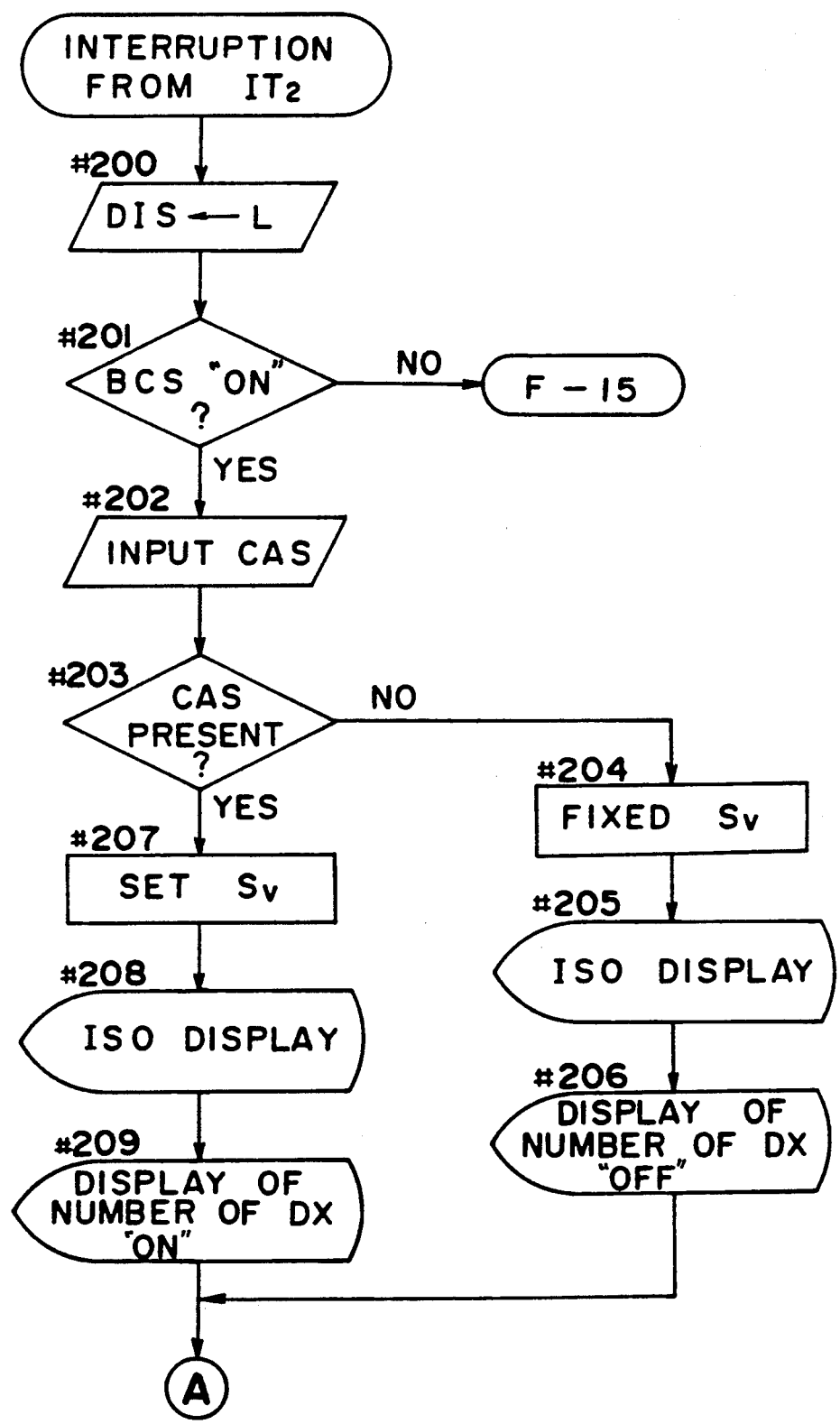
FIGS. 15A to 15C are flow charts showing a processing sequence of display in the camera of FIG. 1.
Figure 15B:
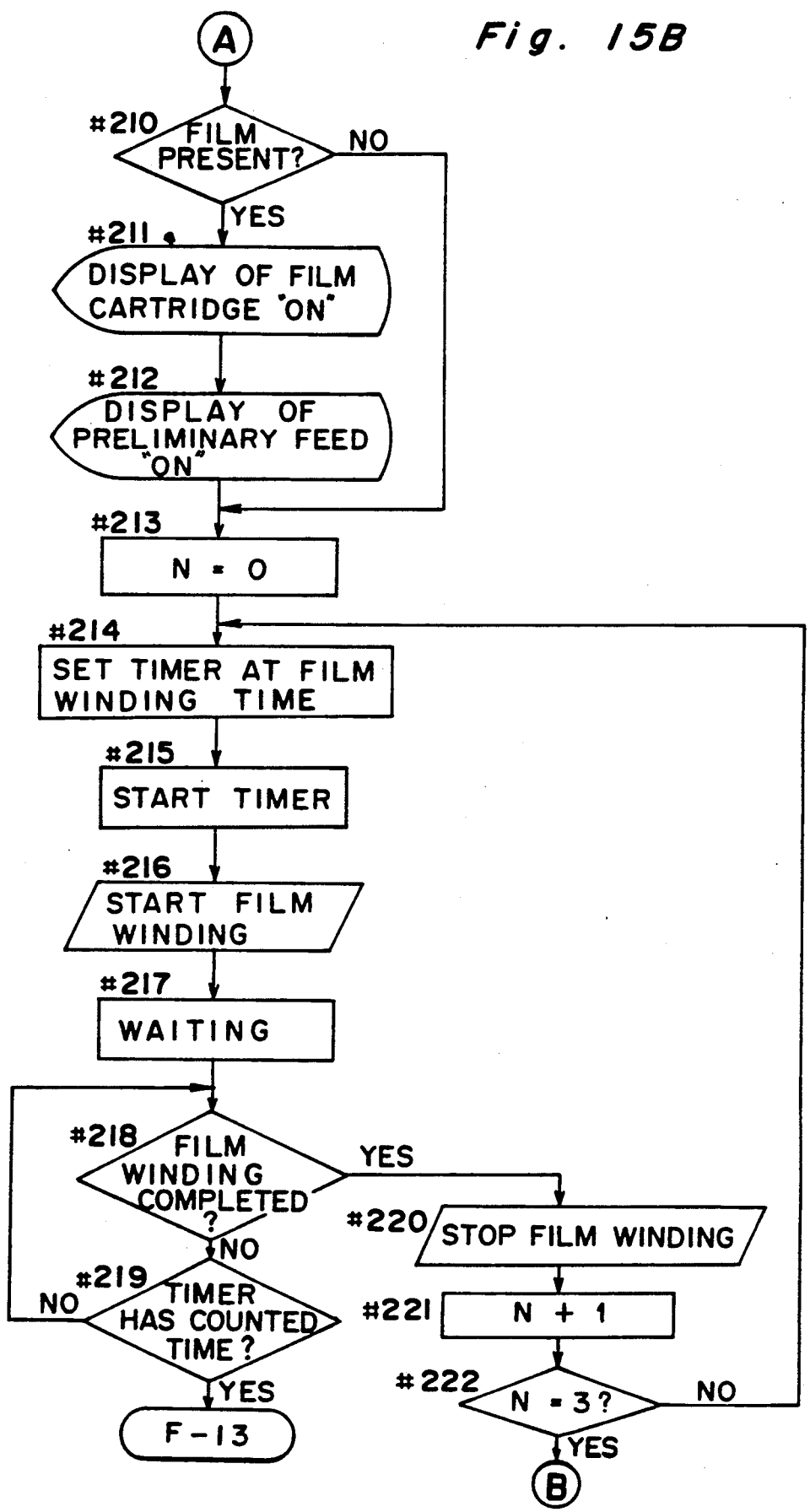
Figure 15C:
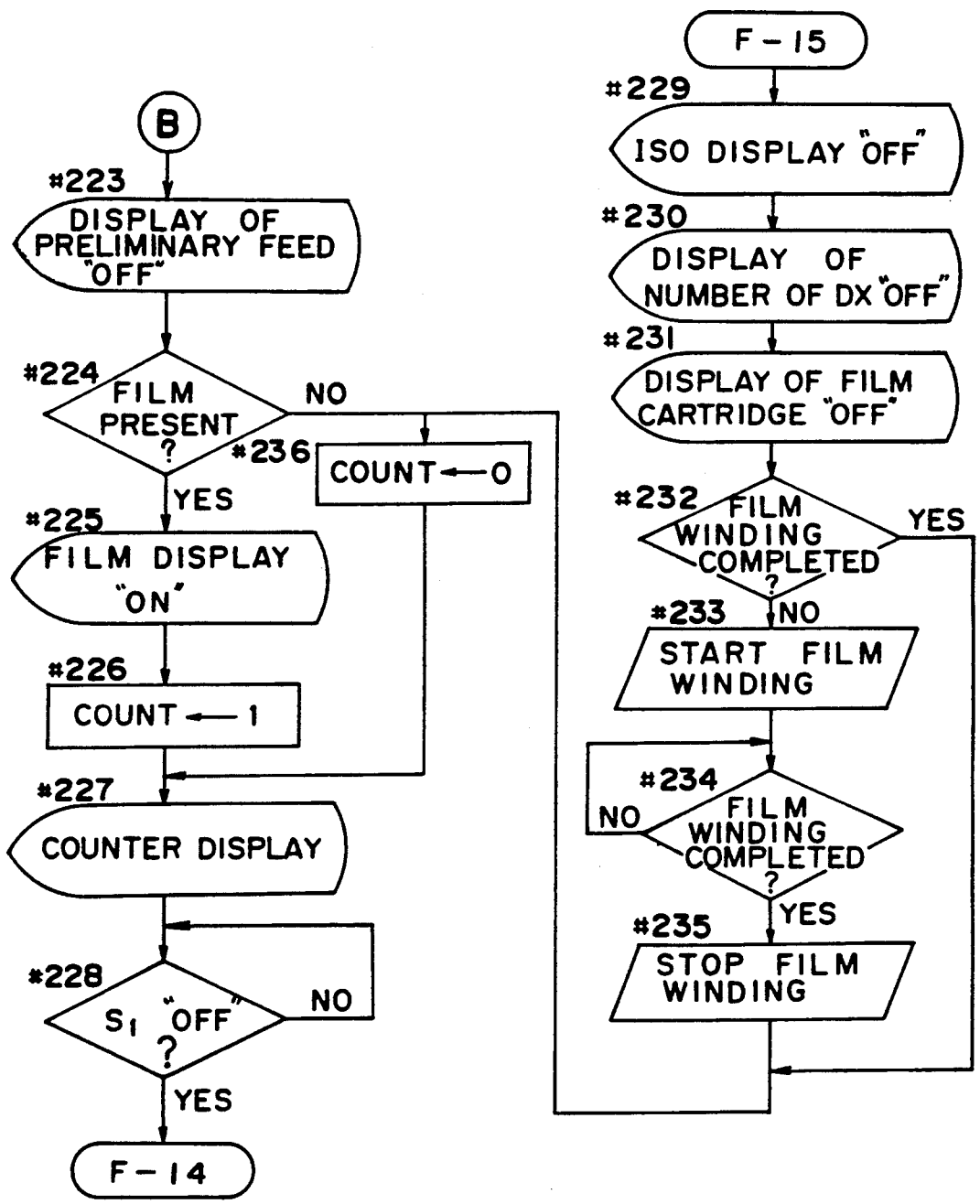

FIGS. 15A to 15C show the display routine for displaying film data on the display panel 5. When pulses outputted from the pulse generator PG1 upon opening and closing of the back cover 43 are applied to the input port $\overline{IT2}$, this routine is started. Initially, the signal DIS for forbidding imprinting of the number of prints on the film is set at the LOW level at step #200. Then, a decision is made as to whether or not the detection switch BCS for detecting opening and closing of the back cover 43 is in the on stare at step #201. If the detection switch BCS is in the on state, namely the back cover 43 is closed, the CAS code is read so as to input the film speed and the number of photographable frames of the film at step #202. Furthermore, a decision is made as to whether or not the CAS code is present at step #203. If the CAS code is not present, a fixed film speed of ISO 100 is displayed on the display panel 5 at steps #204 and #205 and then, display of the number of photographable frames of the DX film is cancelled at step #206. On the other hand, if the CAS code is present, a film speed Sv is set at step #207 and then, the film speed Sv and the number of Photographable frames of the film are displayed on the display panel 5 at steps #208 and #209. Subsequently, if it is found that the film is loaded into the camera body at step #210, the mark "PAM" is displayed on the display panel 5 at step #211. Three frames of the film are required to be fed preliminarily after the film has been loaded into the camera body In order to display this preliminary feed of the film, the display FSM that the film is being preliminarily fed and the display WM that the film is being wound are blinked at step #212. Then, a preliminary winding counter N is set at 0 at step #213 and a preliminary winding timer is set to a preliminary winding time period at step #214. Subsequently, the preliminary winding timer and preliminary winding of the film are started at steps #215 and #216. After waiting for a predetermined time period at step #217, a decision is made as to whether or not preliminary winding of one frame of the film has been completed at step #218. When the preliminary winding timer has completed its time counting at step #219 although preliminary winding of one frame of the film has not been completed, it is considered that preliminary winding of the film is not performed properly. Therefore, in this case, the program flow returns to the rewinding routine of FIG. 13. On the other hand, when preliminary winding of one frame of the film has been completed properly, preliminary winding of the film: is stopped at step #220 and then, one is added to a count of the preliminary winding counter N at step #221. If the count of the preliminary winding counter N is not 3 at step #222, the program flow returns to the winding operation at step #214 again. When the count of the preliminary winding counter N reaches 3, winding of three frames of the film has been completed and the display FSM that the film is being preliminarily fed is cancelled at step #223. Then, after it is reconfirmed that the film is present at step #224, the display that the film is present is turned on at step #225. Subsequently, the frame counter is set at 1 at step #226 and the count of the frame counter is displayed on the display panel 5 at step #227. Subsequently, if it is found that the light measuring switch S1 is in the off state at step #228, the program flow proceeds to the flash photography display routine F-14 of FIG. 14.

When the detection switch BCS for detecting opening and closing of the back cover 43 is in the off state at step #201, namely, the routine of FIG. 15 upon interruption of the input port $\overline{IT2}$ started by opening the back cover 43, display of the film speed ISO, the number CAM of photographable frames of the film and the mark "PAM" indicating loading of the film cartridge into the camera body is cancelled at steps #229, #230 and #231. Then, a decision is made as to whether or not winding of the film has been completed at step #232. If winding of the film has not been completed, winding of the film is commanded at step #233. Winding of the film is continued until winding of the film is completed. When winding of the film has been completed at step #234, winding of the film is stopped at step #235. Subsequently, the frame counter is reset at 0 at step #236 and then, the count of the frame counter is displayed at the step #227.

Figure 16A:
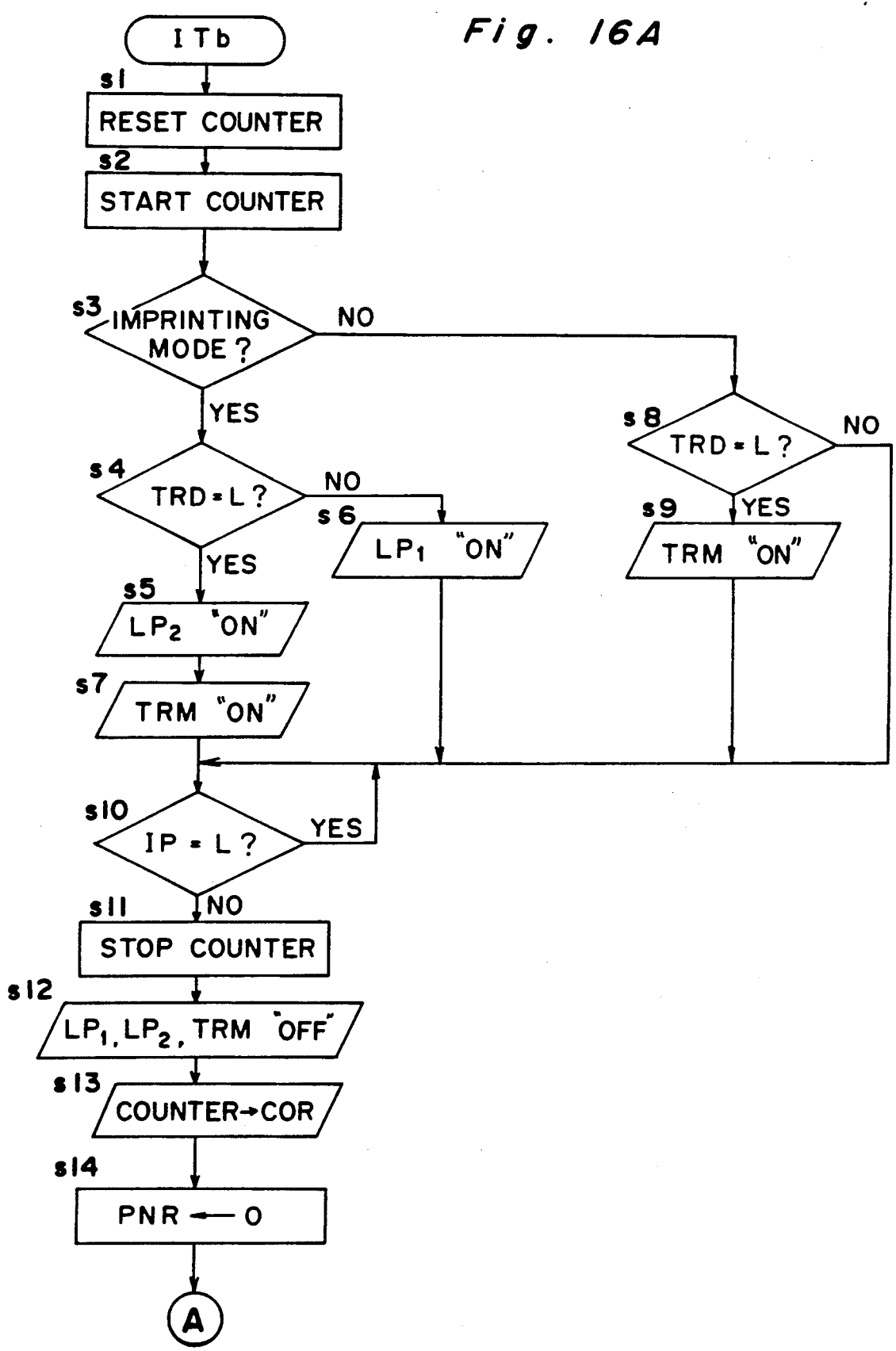
FIGS. 16A and 16B are flow charts showing a processing sequence of signals of the back cover of FIG. 6.
Figure 16B:
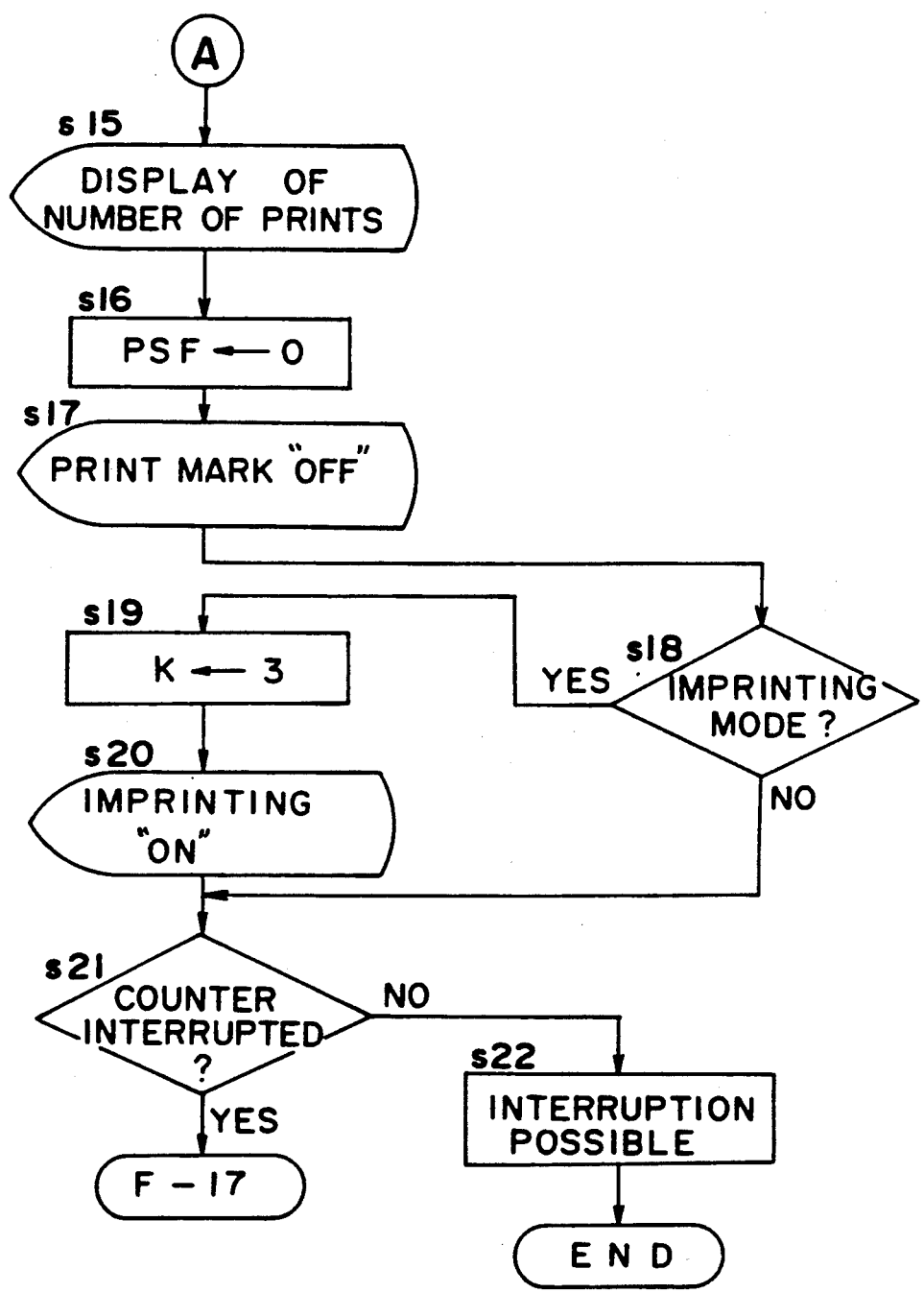

FIGS. 16A and 16B a show a processing sequence of signals of the back cover 43 for imprinting various data on the film and displaying them on the display portion of the back cover 43. Initially, when the imprint signal IP for interruption from the camera body is inputted to the interruption terminal $\overline{ITb}$ a counter for counting an imprinting time period for imprinting data on the film is reset at step s1 and then, is started at step s2. If it is found from the date imprinting mode switch 50 that the camera K1 is in the date imprinting mode at step s3, a decision is made as to whether or not the camera K1 is in the pseudo focal length photographing mode at step s4. Also in the case where the camera K1 is not in the date imprinting mode, a decision is made as to whether or not the camera K1 is in the pseudo focal length photographing mode at step s8. According to the decisions at step s4, the imprinting light source LP1 or LP2 is turned on at step s5 or s6. In the case of the pseudo focal length photographing mode, the light source 38 for a trimming mark TRM is turned on so as to imprint these data on the film at step s7 or s9. Subsequently, upon completion of imprinting of the data on the film, namely when the imprint signal IP is set at the LOW level at step s10, the counter is stopped at step s11. Then, the imprinting light sources LP1 and LP2 and the light source 38 for the trimming mark TRM are turned off at step s12.

Subsequently, preparations for imprinting the number of prints are started. Initially, the count of the counter is transferred to a register COR such that preparations for controlling an imprinting time period of the signal indicative of the number of prints are performed at step s13. Thus, a register PNR for the number of prints is reset at 0 at step s14 and then, a printing completion flag PSF is reset at 0 at step s16. Thereafter, the mark 49 for indicating that the number of prints has been imprinted on the film is turned off at step s17. Then, if it is found that the camera K1 is in the date imprinting mode at step s18, a counter K for counting a time period for displaying a print mark 48 disposed at a portion in the date display portion 46 of the back cover 43 is set at, for example, 3 at step s19 and the print mark 48 is displayed for a predetermined time period, for example, three seconds at step s20. Thereafter, a decision is made as to whether or not interruption at intervals of one second for displaying dates, time, etc. is performed at step s21. If the interruption does not exist, the interruption is allowed at step s22 and then, the program flow stops. Meanwhile, if the interruption exists, the program flow proceeds to an interruption routine F-17 at intervals of one second in FIG. 17.

Figure 17:
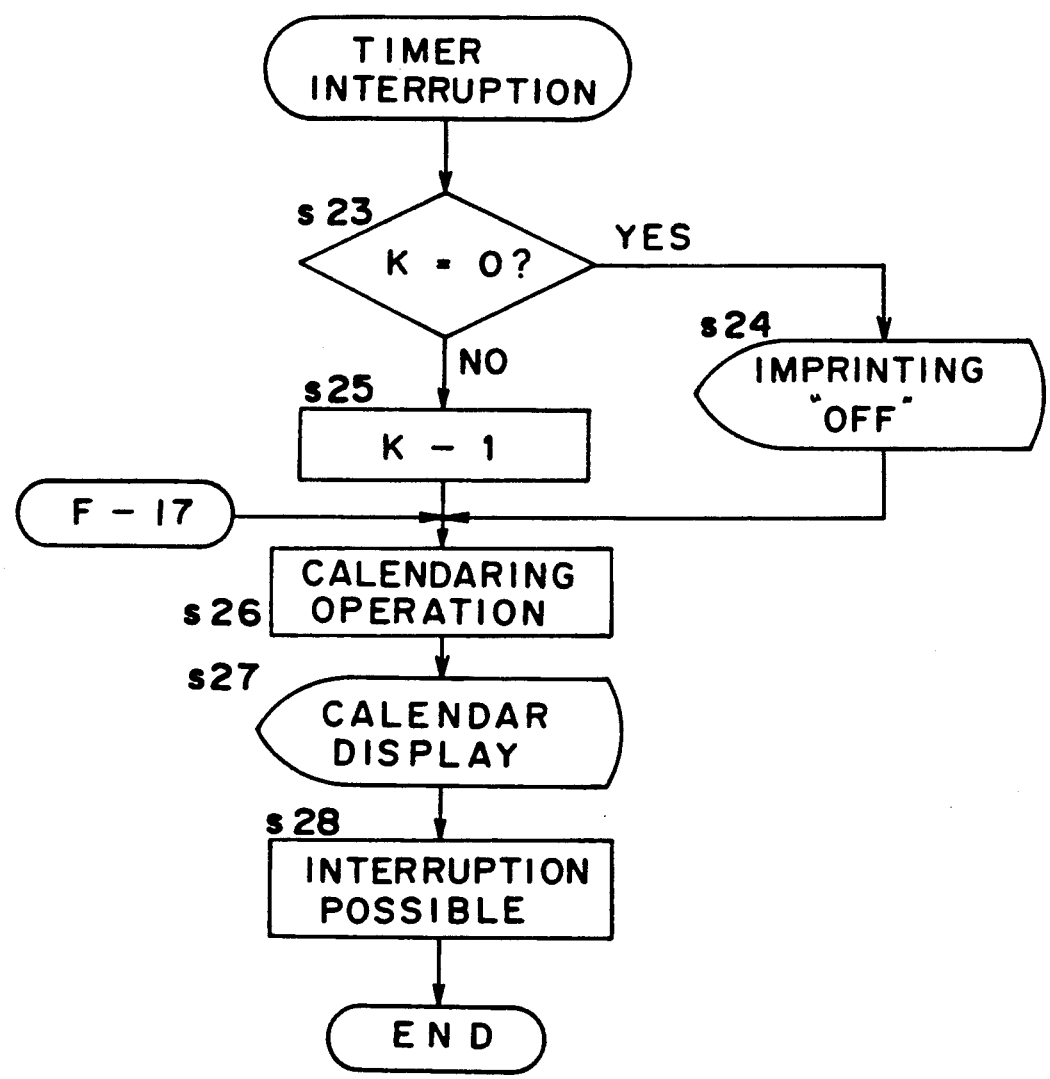
FIG. 17 is a flow chart showing a processing sequence of interruption in the camera of FIG. 1.

Hereinbelow, the interruption routine at intervals of one second is described with reference to FIG. 17. After start of the interruption, a decision is made as to whether or not the count of the counter K is 0 at step s23. If the count of the counter K is 0, the print mark 48 is turned off at step s24. On the other hand, if the count of the counter K is not 0, one is reduced from the count of the counter K at step s25. Then, calendaring operations are performed at step s26. A date, time, etc. of photographing are displayed on the date display portion 46 through increment of one second of year, month, day, hour, minute and second at step s27. After the interruption is allowed at step s28, the program flow stops.

Figure 18:
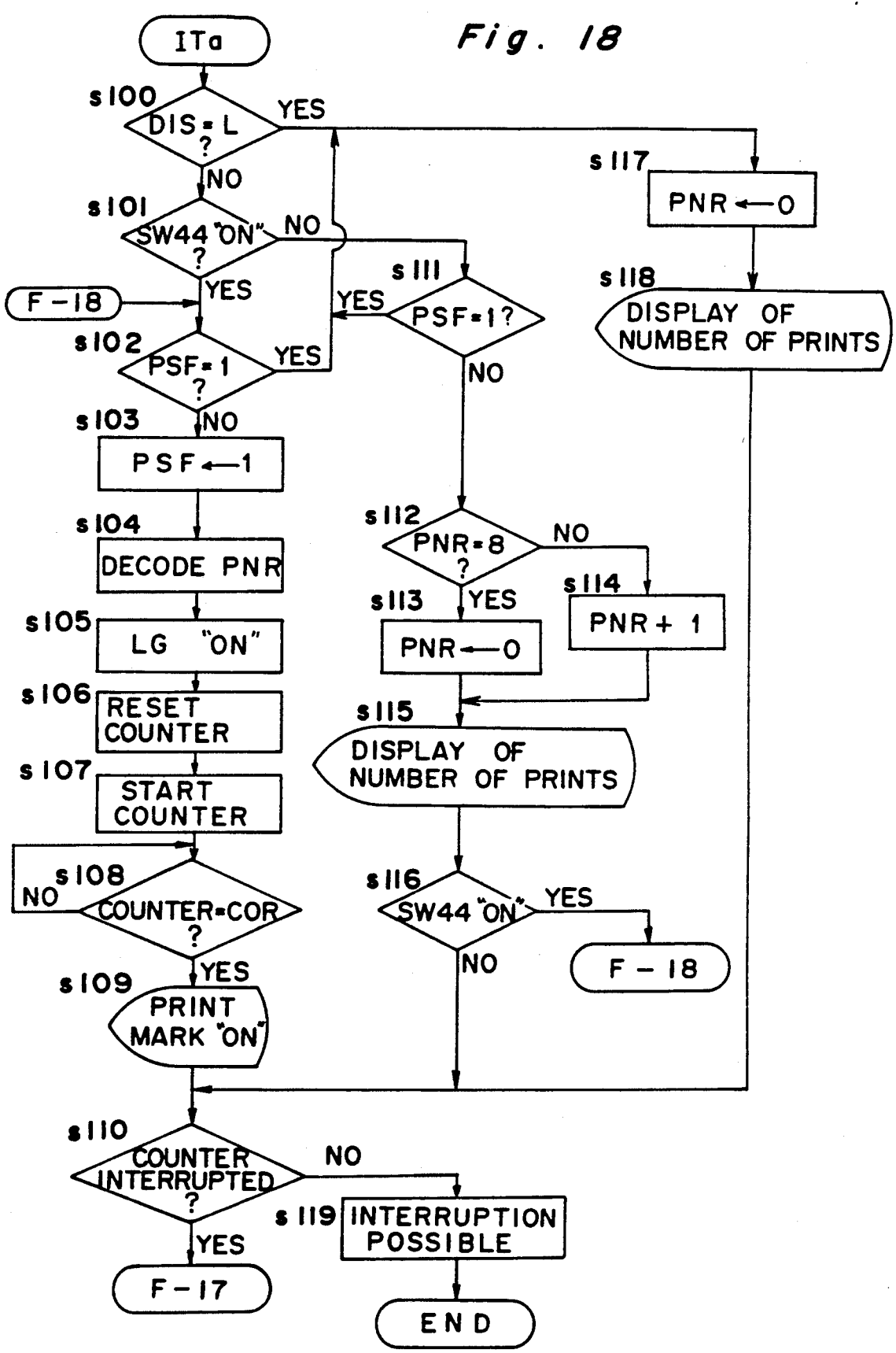
FIG. 18 is a flow chart showing a processing sequence of imprinting of the number of prints in the camera of FIG. 1.

FIG. 18 shows a processing sequence of imprinting of the number of prints on the film in the camera K1. When the switch 45 for setting the number of prints or the switch 44 for imprinting the number of prints is turned on, an interruption signal is inputted to the port ITa of the second processor CPU2 through an AND circuit AN and thus, this processing sequence is started. If it is found that the signal DIS for forbidding imprinting the number of prints on the film is not at the LOW level at step s100, namely imprinting of the number of prints is allowed, a decision is made as to whether or not the switch 44 is in the on state at step s101. If the switch 44 is in the on state, a decision is made as to whether or not the printing completion flag PSF is 1 at step s102. When the printing completion flag PSF is not 1, the print completion flag is set to 1 at step s103 and then, contents of the register PNR for the number of prints are decoded at step s104 and the light source LG for imprinting the number of prints on the film is turned on at step s105. Meanwhile, when the contents of the register PNR are 0, the number of prints is one (normal) and the light source LG is not turned on. Table 1 below shows the number of prints and contents of the register PNR.

TABLE 1

| PNR | | Number of prints |
|---|---|---|
| 0 0 0 0 | 0 | 1 (No imprinting) |
| 0 0 0 1 | 1 | 2 |
| 0 0 1 0 | 2 | 3 |
| 0 0 1 1 | 3 | 4 |
| 0 1 0 0 | 4 | 5 |
| 0 1 0 1 | 5 | 6 |
| 0 1 1 0 | 6 | 7 |
| 0 1 1 1 | 7 | 8 |
| 1 0 0 0 | 8 | 0 (No printing) |

After a counter for setting an imprinting time period has been reset at step s106, counting of the counter is started at step s107. Then, if it is found at step s108 that the count of the counter is equal to the contents of the register COR in which the imprinting time period corresponding to the film speed ISO delivered from the camera body was preliminarily set, the light source LG is turned off and the mark 49 for indicating that the number of prints has been imprinted on the film, which is provided on the back cover 43, is displayed at step s109. Subsequently, a decision is made as to whether or not interruption of the counter at intervals of one second exists at step s110. If the interruption of the counter exists, the program flow proceeds to the calendaring operations of the interruption routine F-17 at intervals of one second in FIG. 17 and data such as dates are displayed such that the interruption of the counter is allowed.

On the other hand, when the switch 44 for imprinting the number of prints on the film is not in the on state, the switch 45 for setting the number of prints is in the on state. Thus, if it is found that the printing completion flag PSF is 1 at step s111, namely printing has been completed, the register PNR for the number of prints is reset to 0 at step s117 and then, "1" is displayed on the display portion of the number of prints of the back lid 43 at step s118 and a decision is made as to whether or not interruption of the counter exists at step s110. Meanwhile, when the printing completion flag PSF is not 1 at step s111, a decision is made as to whether or not contents of the register PNR for the number of prints are 8 at step s112, namely the number of prints is 0. If the contents of the register PNR are 8, the register PNR is reset to 0 at step s113, namely the number of prints is reset to 1. If the contents of the register PNR are not 8, one is added to the contents of the register PNR at step s114 and then, the number of prints corresponding to the contents of the register PNR is displayed on the display portion 47 for displaying the number of prints at step s115, which is provided on the back cover 43. Thereafter, if it is found that the switch 44 is in the on state at step s116, the program flow proceeds to a routine F-18.

Figure 19:
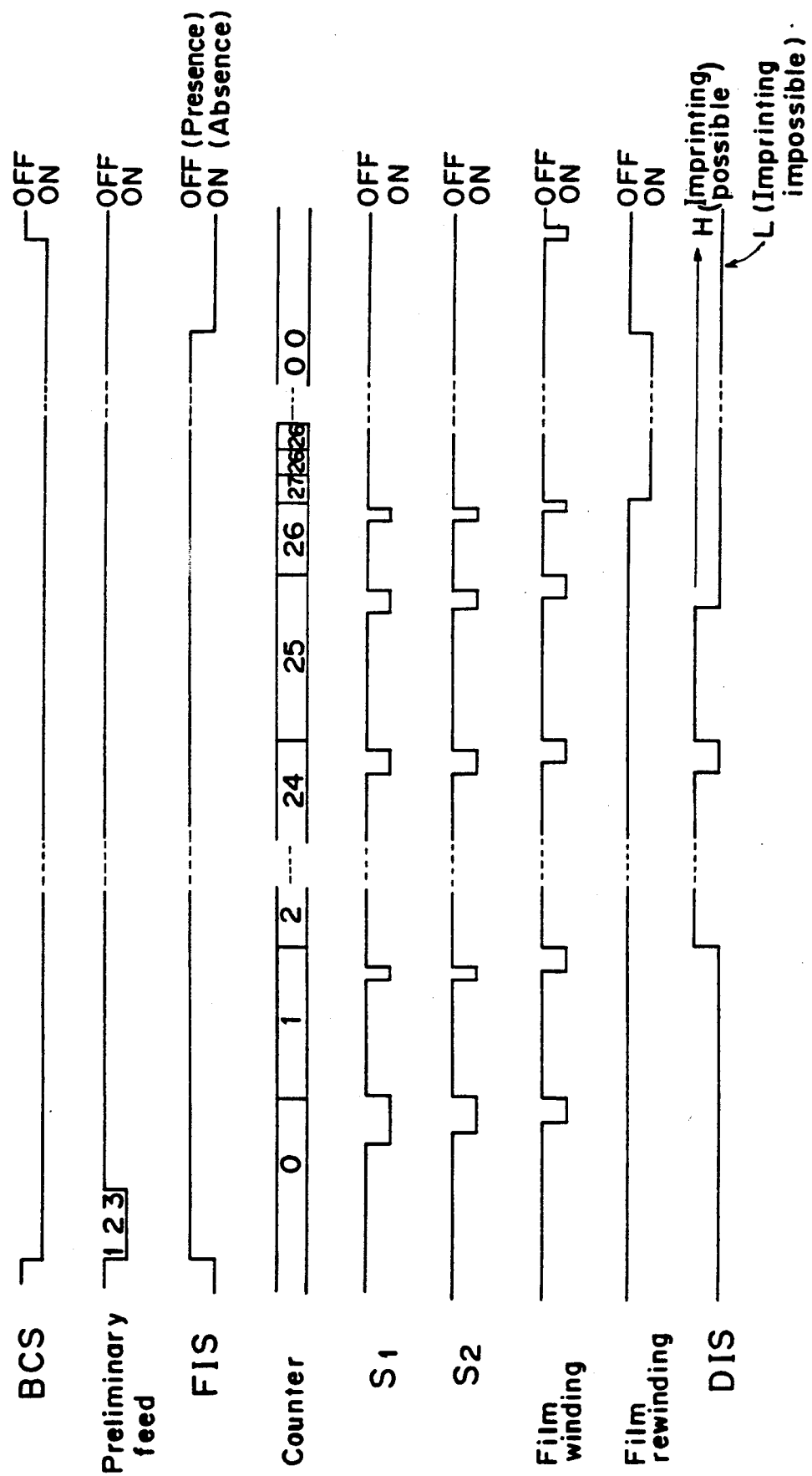
FIG. 19 is a time chart explanatory of time possible to imprint the number of prints in the camera of FIG. 1.

FIG. 19 is a time chart explanatory of time possible to imprint the number of prints on the film. When the detection switch BCS for detecting opening and closing of the back cover 43 is in the on state (the back cover 43 is closed), preliminary feeding of the film is in the off state (preliminary feeding of the film has been completed), the detection switch FIS for detecting loading of the film into the camera body is in the on state, the light measuring switch S1 and the release switch S2 are in the off state and film winding and film rewinding are in the off state, the signal DIS for forbidding imprinting of the number of prints on the film is at the HIGH level and thus, imprinting of the number of prints on the film is allowed. When the second frame of the film is disposed at the image plane, it becomes possible to imprint the number of prints outside the picture frame of the first frame of the film. If the film consists of 24 frames, the DX code assumes 24. In this case, when the 25-th frame is dispose at the image plane, the number of prints can be imprinted outside the picture frame of the 24-th frame of the film. However, after start of photographing of the 25-th frame of the film, imprinting of the number of prints on the film cannot be performed. Since imprinting of the number of prints on one frame of the film is performed after completion of winding of the previous frame of the film, it is impossible to imprint the number of prints on the last frame of the film when winding of the film is not completed due to the fact that the film is wound to its distal end prior to completion of winding of the last frame of the film. It is possible to imprint the number of prints on the photographable frames of the film, which photographable frames of the film are guaranteed in number by the film.

Figure 20:
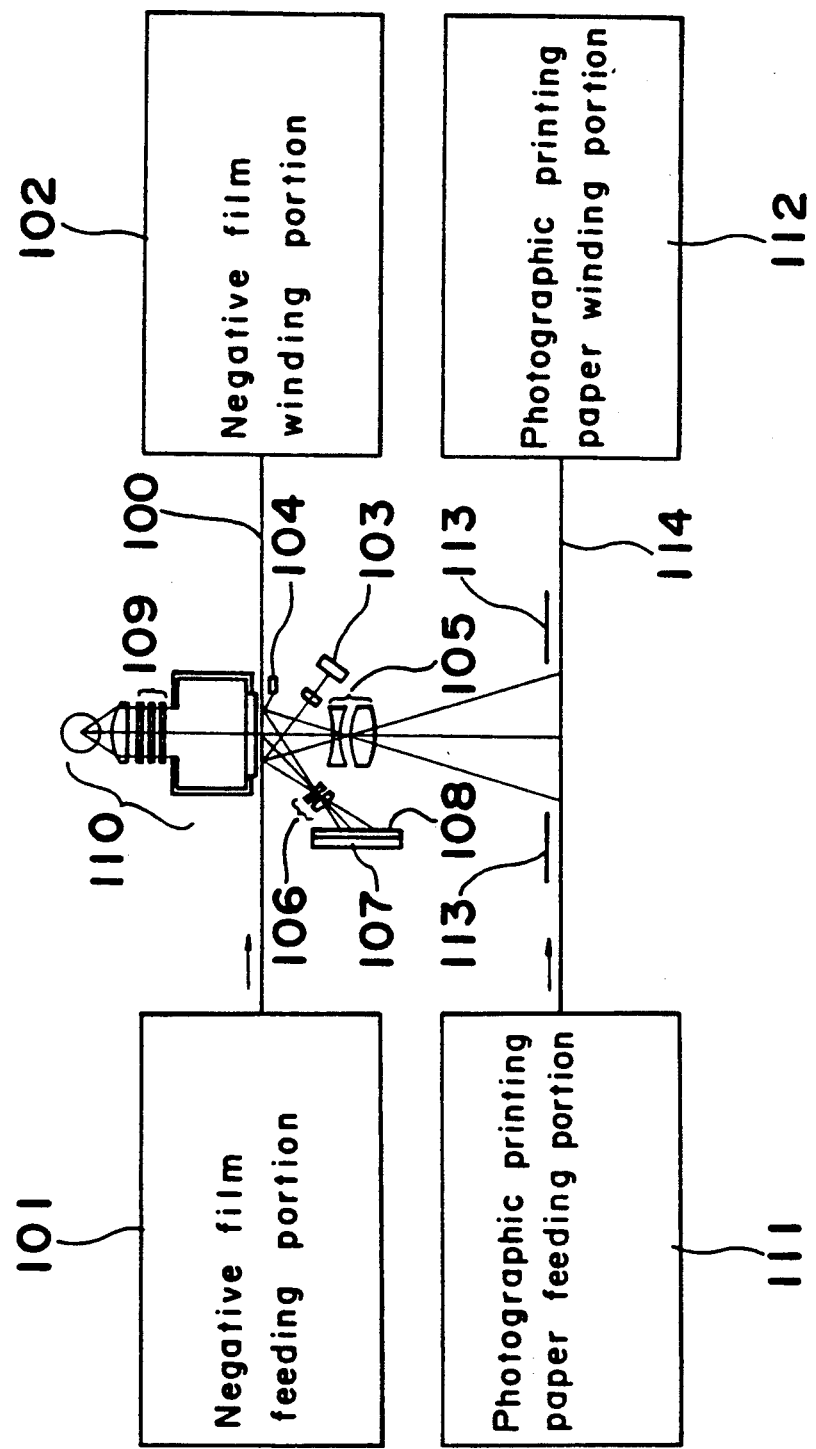
FIG. 20 is a schematic view of a film printer for the camera of the present invention.

FIG. 20 shows a printer for printing the film photographed by the camera of the present invention. It is to be noted that the printer .can be applied to the film photographed not only by the camera K1 but also by cameras K2 and K3 according to second and third embodiments of the present invention to be described later. In the printer, a negative film 100 delivered from a negative film feeding portion 101 is wound by a negative film winding portion 102. A light source portion 110 constituted by a lamp, a condenser lens, a diffusing plate and a mixing box is disposed at a central portion between the negative film feeding portion 101 and the negative film winding portion 102. The light source portion 110 is provided with color filters 109. Below the lower face of the negative film 100 provided are a detector 103 for detecting a frame edge of the film, a code reader 104, printing zoom lens 105, light measuring and color measuring zoom lens 106, a light measuring and color measuring sensor 107 and a color separation filter 108 attached to the front face of the light measuring and color measuring sensor 107. Furthermore, a photographic printing paper feeding portion 111 and a photographic printing paper winding portion 112 are provided below the printing zoom lens 105. A photographic printing paper 114 is fed from the photographic printing paper feeding portion 111 so as to be wound by the photographic printing paper winding portion 112. Meanwhile, a shutter 113 is provided forwardly of the printing zoom lenses 105 and adjacent to the upper face of the photographic printing paper 114.

Then, operations of the printer of FIG. 20 is described. When the negative film 100 is advanced to a printing position, the detector 103 detects the frame edge of the negative film 100 so as to stop the negative film 100. Then, the code reader 104 reads codes of the trimming mark and the number of prints, which are provided on the negative film 100. According to whether or not the pseudo focal length photographing mode is set, the light measuring and color measuring lenses 106 and the printing zoom lenses 105 are adjusted. In the case where the pseudo focal length photographing mode is set and is not set, a trimming position of the film and a whole image plane of the film are, respectively, subjected to light measurement and color measurement by the light measuring and color measuring sensor 107 having the color separation filter 108 attached thereto such that selection and adjustment of the color filters 109 of the light source portion 110 are performed. Subsequently, the shutter 113 is opened so as to expose the photographic printing paper 114. After exposure of the photographic printing paper 114, the shutter 113 is closed such that the subsequent printing operation is performed.

FIG. 21 shows a control unit employed in the printer of FIG. 20. The control unit includes a processor CPU3. The processor CPU3 controls operations of constituent elements of the printer of FIG. 20, calculates the light measurement value and performs exposure control of the photographic printing paper 114. In the processor CPU3, processed are such signals as a photographic printing paper feeding signal 121 delivered from the photographic printing paper feeding portion 111 and the photographic printing paper winding portion 112, a negative film feeding signal 122 given by the negative film feeding portion 101 and the negative film winding portion 102, a detection signal 123 transmitted from the detector 103, light measurement and color measurement values 124 given by the light measuring and color measuring sensor 107, a code signal 125 indicating the trimming mark and the number of prints, which is delivered from the code reader 104, a positional detection and control signal 126 given by the light measuring and color measuring zoom lens 106 and the printing zoom lens 105, a signal 127 indicating opening and closing of the shutter 113, a control signal 128 of the color filters 109 of the light source portion 110, n exposure control signal 129 of the light source portion 110 and a signal 130 indicating start and completion of printing.

Figure 22A:
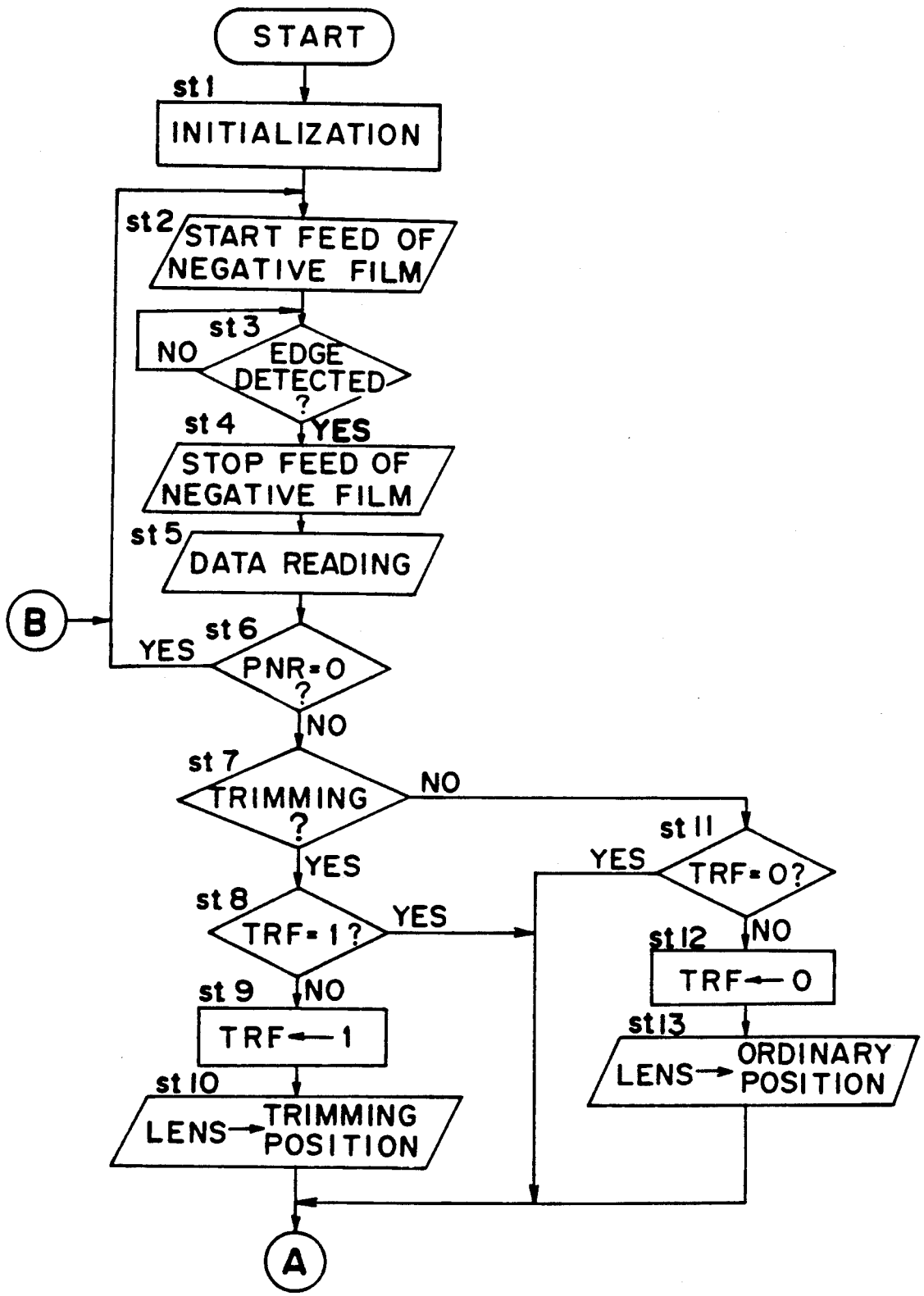
FIGS. 22A and 22B are flow charts showing a processing sequence of control in the printer of FIG. 20.
Figure 22B:
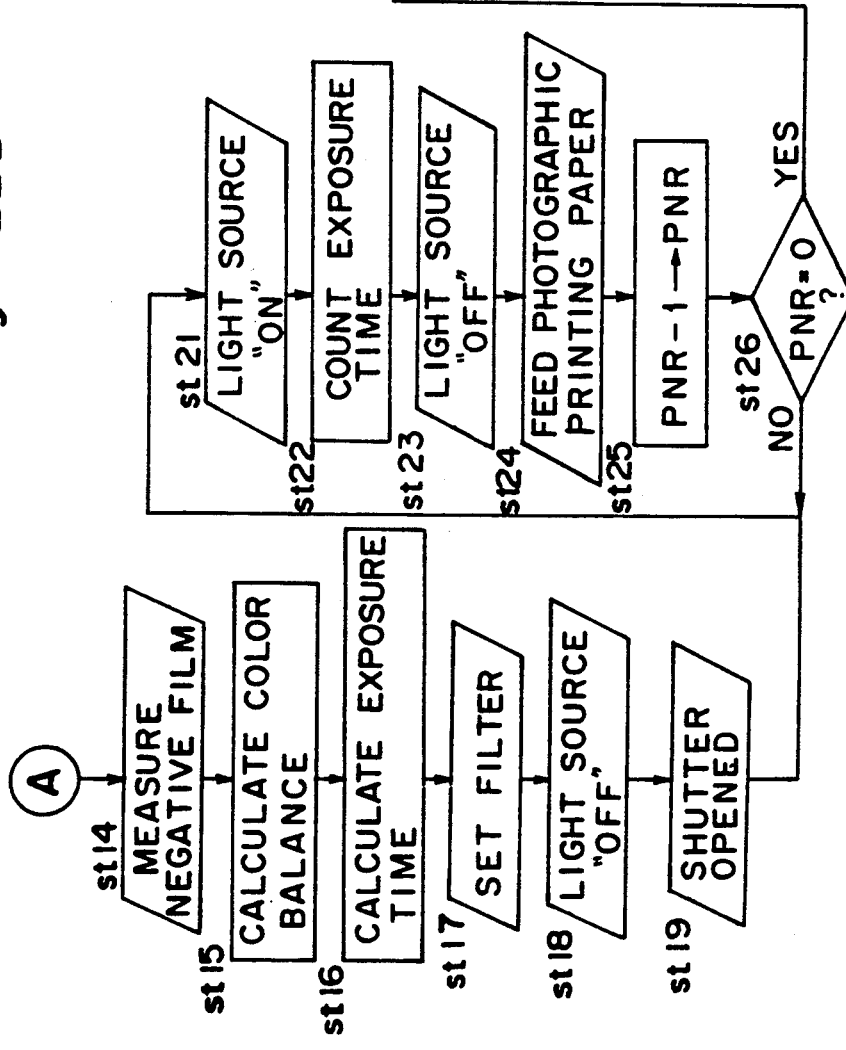

FIGS. 22A and 22B show a processing sequence of signals associated with printing of the photographic printing paper 114 in the processor CPU3. Initially, an initial value is set at step st1 and then, feeding of the negative film 100 is commanded at step st2. Then, if the frame edge is detected at step st3, feeding of the negative film 100 is stopped at step st4. Subsequently, data of the trimming mark and the number of prints are read so as to be set in the register PNR at step st5. If the number of prints is 0 at step st6, the program flow returns to feeding of the negative film 100 of step st2 without performing printing operations. A decision is made as to whether or not the trimming mark is present at step st7. If the pseudo focal length photographing mode is set and the trimming mark is present, a decision is made as to whether or not a flag TRF indicating the previous trimming of the film is 1 at step st8. If the flag TRF is 1, namely the pseudo focal length photographing mode is set, light measurement and color measurement of the negative film 100 are immediately started at step st14. On the other hand, if the flag TRF is not 1, the flag TRF is set to 1 at step st9 and the lenses are displaced to the trimming position at step st10. Meanwhile, also when the pseudo focal length photographing mode is not set, the program flow proceeds similarly at steps st11 and st12 but in this case, the lenses are displaced to an ordinary position at step st13.

Thereafter, the negative film 100 is measured at step st14. Furthermore, color balance is calculated at step st15 and then, an exposure time period is calculated at step st16. A necessary one of the color filters 109 is selectively set in the light source portion 110 at step st17. Subsequently, the light source portion 110 is turned off at step st18 and then, the shutter 113 is opened at step st18 so as to expose the photographic printing paper 114 by turning on the light source portion 110 at step st21. The above described exposure time period calculated beforehand is measured by a counter at step st22. Upon lapse of a predetermined time period, the light source portion 110 is turned off at step st23 and one sheet of the photographic printing paper 114 is delivered at step st24. Then, one is reduced from the contents of the register PNR for the number of prints until the contents of the register PNR reach 0 at steps st25 and st26. When the contents of the register PNR have reached 0 at step st26, printing of a required number of sheets of the photographic printing paper 114 has been completed. Thus, the shutter 113 is closed at step st27 and the color filters 109 are reset at step st28. Furthermore, if a negative film to be printed exists at step st29, printing operations are continued at step st31. When printing of the photographic printing paper 114 has been completed, printing operations are stopped at step st30.

Figure 23:
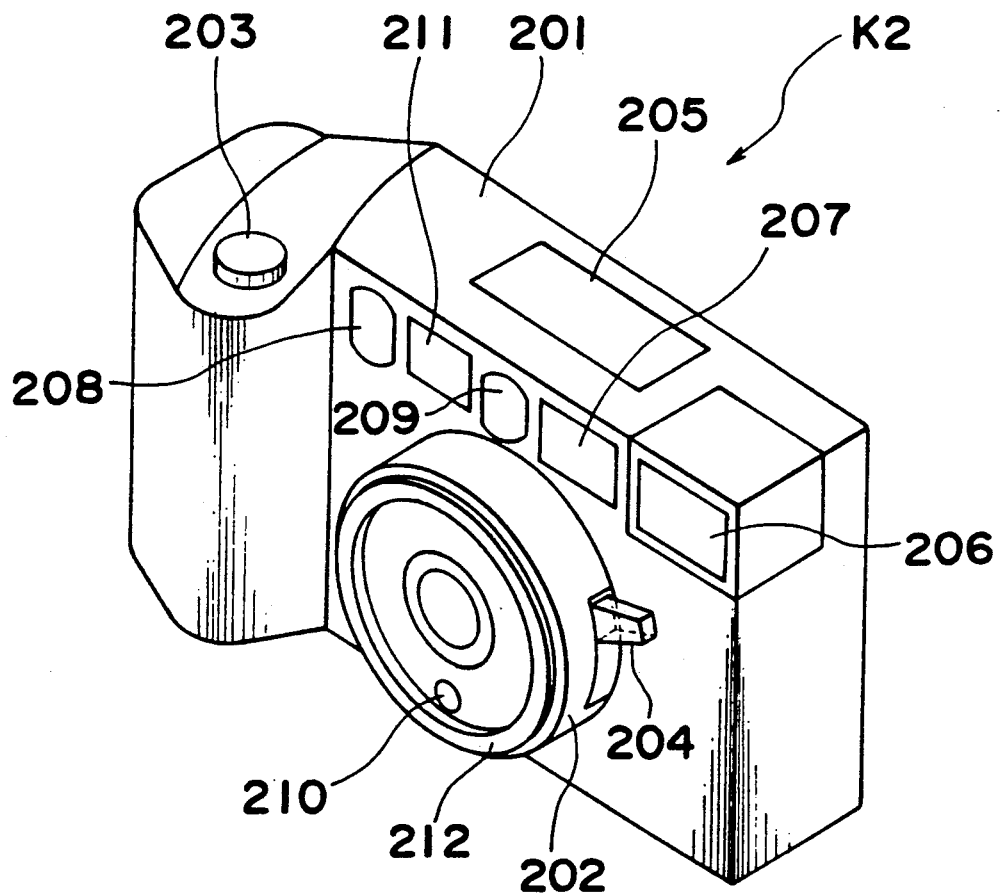
FIG. 23 is a perspective view of a camera according to a second embodiment of the present invention.
Figure 24:
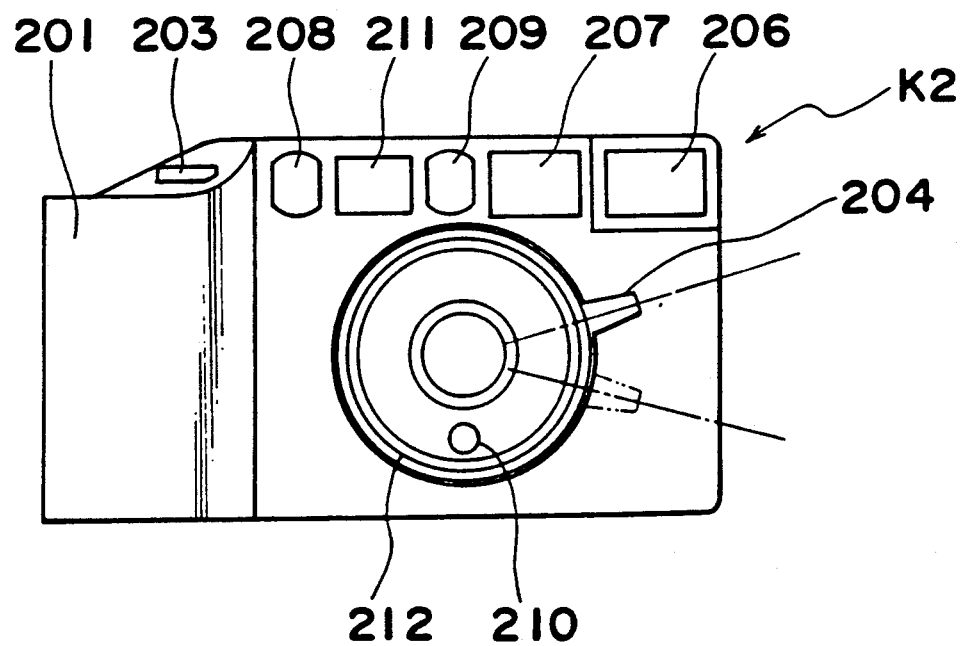
FIG. 24 is a front elevational view of the camera of FIG. 23 in the real focal length photographing mode.
Figure 25:
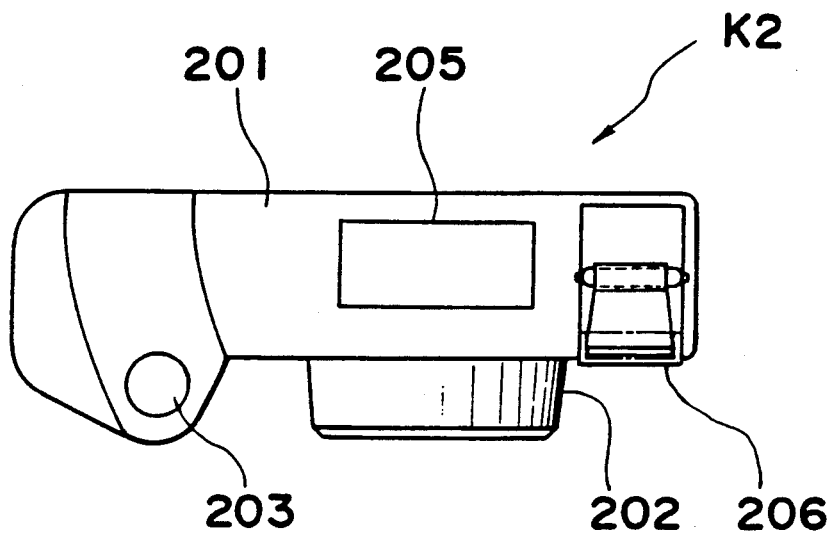
FIG. 25 is a top plan view of the camera of FIG. 24.

The camera K2 according to the second embodiment of the present invention is described with reference to FIGS. 23 to 28. As shown in FIG. 23, the camera K2 includes a camera body 201, a lens barrel 202 having an objective lens, a shutter release button 203, a trimming lever 204, a liquid crystal display unit 205, a flash device 206, a viewfinder window 207, distance measuring windows 208 and 209 and a light receiving window 210 for an automatic exposure control portion (AE), which correspond to the camera body 1, the objective lens 2, the shutter release button 3, the trimming lever 4, the liquid crystal display panel 5, the flash light emitting panel 6, the viewfinder window 7, the distance measuring windows 8 and 9 and the light receiving window 10 for the automatic exposure control portion (AE) of the camera K1 of FIG. 1, respectively. Reference numeral 211 denotes a natural lighting window for displaying a frame indicative of a photographing zone in field of view in the viewfinder. In the camera K1 of FIG. 1, the trimming lever 4 is so provided on the camera body 1 as to be slid in the sidewise direction of the camera body 1. However, in the camera K2, the trimming lever 204 is so provided as to be rotated along the lens barrel 202 about the optical axis of the objective lens. When the trimming lever 204 is disposed at an upper position as shown in FIG. 23, the camera K2 is in the earlier said wide angle (standard) state (real focal length photographing mode) in which trimming of the film is not performed in the printing operation. FIGS. 24 and 25 are a front elevational view and a top plan view of the camera K2 in the wide angle state (real focal length photographing mode), respectively.

Figure 26:
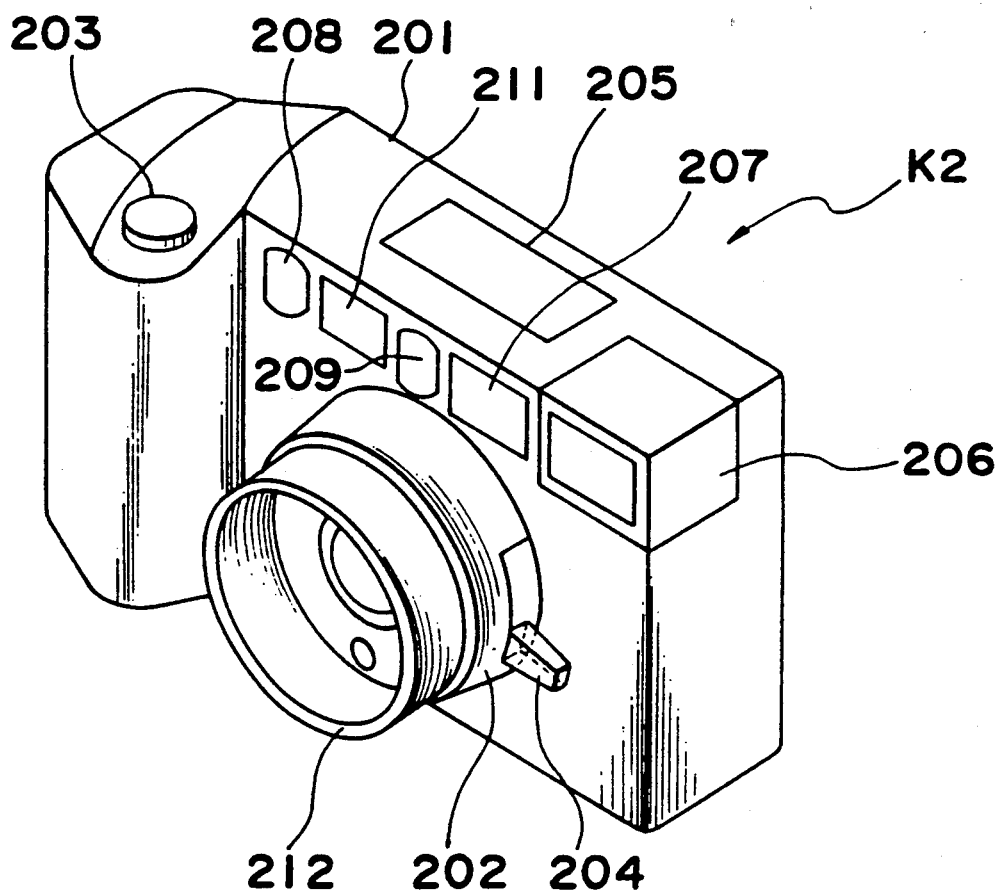
FIG. 26 is a perspective view of the camera of FIG. 23 in the pseudo focal length photographing mode.

On the other hand, when the trimming lever 204 is displaced downwardly from the upper position of the wide angle state (real focal length photographing mode) of FIG. 23 to a lower position as shown in FIG. 26, the camera K2 is set in a telephoto state (pseudo focal length photographing mode) in which trimming of the film is performed in the printing operation. As will be seen from comparison between FIGS. 23 and 26, when the camera K2 is in the telephoto state by setting the trimming lever 204 to the lower position, a hood 212 is projected out of the lens barrel 202 in the direction of the optical axis of the lens barrel 202. The hood 212 is movably supported by the lens barrel 202 so as to be displaced in the optical axis of the lens barrel 202 in response to rotation of the trimming lever 204. By this arrangement of the camera K2, a user of the camera K2 can easily determine from external appearance of the camera K2 whether the camera K2 is set to the wide angle state or the telephoto state, thereby resulting in reduction of erroneous operations of the camera K2 by the user. Meanwhile, it is so arranged that display of the liquid crystal display unit 205 for displaying that the camera K2 is in one of the real focal length photographing mode and the pseudo focal length photographing mode is changed over by a switch (not shown) changed over in response to displacement of the trimming lever 204.

Figures 27A, 27B, 27C:
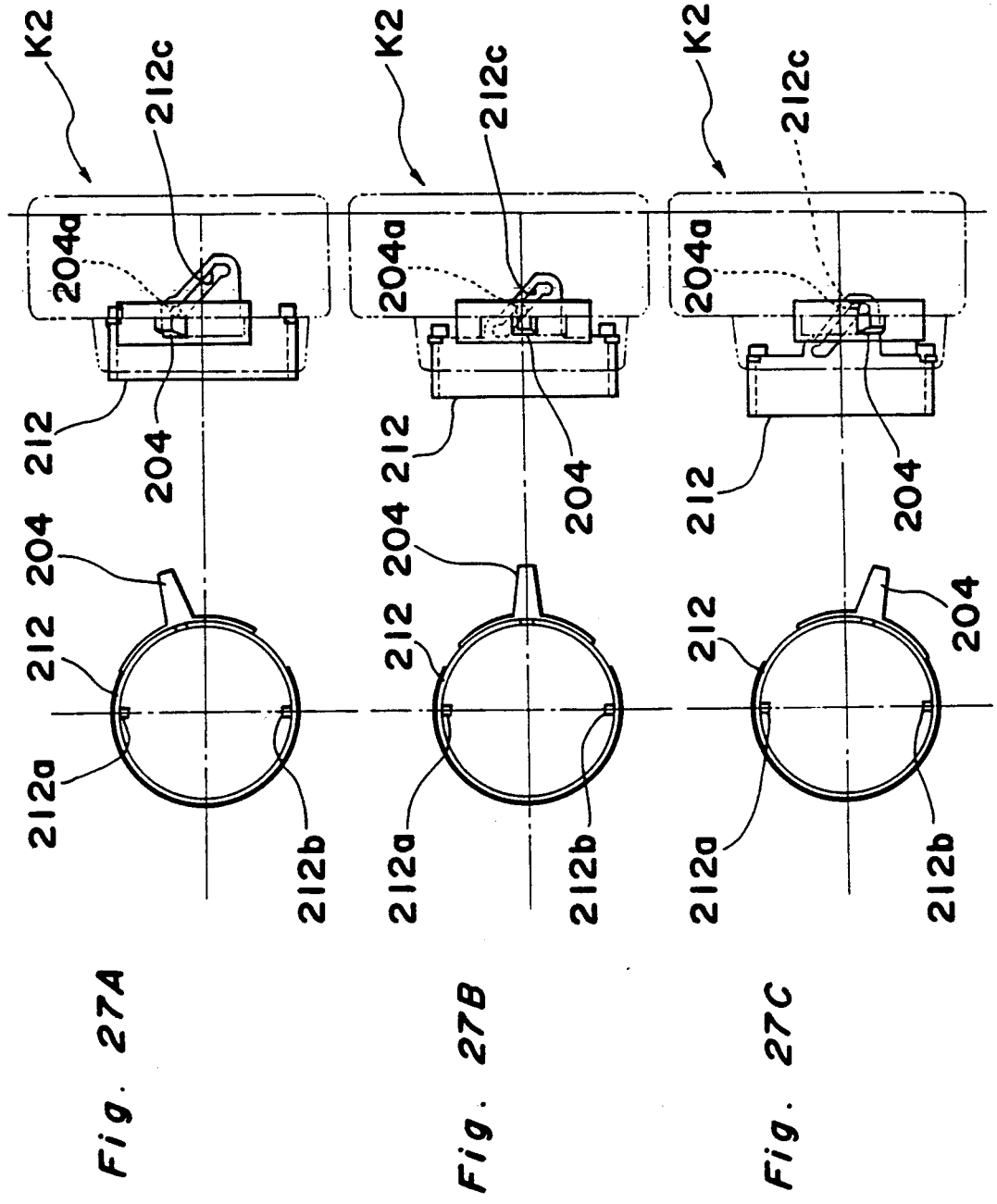
FIGS. 27A to 27C are views showing transitional states of a front face and a side face of a lens barrel of the camera of FIG. 23 during its changeover from the real focal length photographing mode to the pseudo focal length photographing mode, respectively.

Then, a mechanism for displacing the hood 212 in response to rotation of the trimming lever 204 is described. FIGS. 27A to 27C include front elevational views and side elevational views of a peripheral portion of the lens barrel 202 of the camera K2. FIG. 27A shows the real focal length photographing mode in which the trimming lever 204 is disposed at the upper position. FIG. 27C shows the pseudo focal length photographing mode in which the trimming lever 204 is disposed at the lower position. FIG. 27B shows a transitional state between the real focal length photographing mode and the pseudo focal length photographing mode. As shown in the side elevational views of FIGS. 27A to 27C, the hood 212 is supported by a pair of guides 212a and 212b disposed symmetrically with respect to the optical axis so as to be displaced only in the direction of the optical axis. A cam groove 212c is formed at a rear end of the hood 212. Meanwhile, a pin 204a engageable with the cam groove 212c is driven into the trimming lever 204. Hence, when the trimming lever 204 is displaced downwardly from the real focal length photographing mode in which the trimming lever 204 is disposed at the upper position of FIG. 27A, the pin 204a depresses the cam groove 212c so as to thrust the hood 212 forwardly in the optical axis such that the hood 212 is projected out of the lens barrel 202 as shown in FIGS. 27B and 27C.

Figure 28:
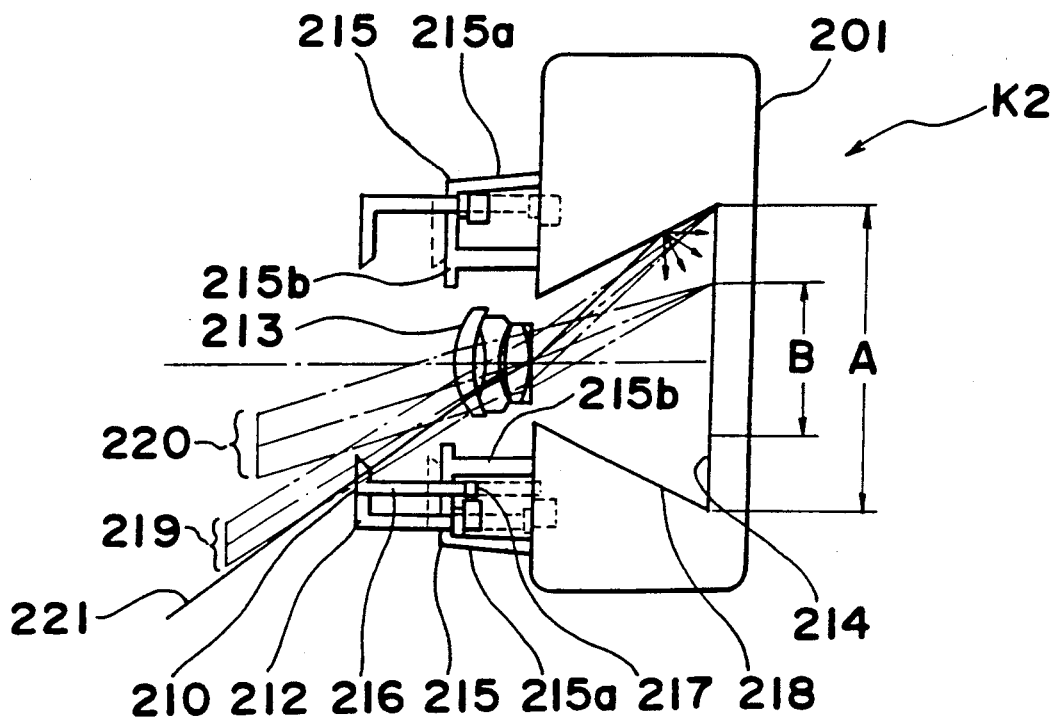
FIG. 28 is a longitudinal sectional view of the lens barrel of FIG. 27.

Then, an arrangement in the lens barrel 202 is described. FIG. 28 shows the lens barrel 202 and the camera body 201 in the pseudo focal length photographing mode. In FIG. 28, reference numeral 213 denotes an objective lens system and reference numeral 214 denotes a film plane. In the real focal length photographing mode, a zone corresponding to a frame A is printed through its enlargement. Meanwhile, in the pseudo focal length photographing mode, a zone B narrower than the frame A is printed through its enlargement. Reference numeral 215 denotes a lens barrel cover for holding the objective lens system 213 integrally and for shielding light of a side face and a front face of the objective lens system 213. The lens barrel cover 215 is constituted by a side face cover 215a for shielding undesirable light directed to the side face of the objective lens system 213 and a front face cover 215b for shielding undesirable light directed to the front face of the objective lens system 213 and is secured to the camera body 201. The hood 212 is supported by the lens barrel cover 215 so as to be displaced in the direction of the optical axis. The above described light receiving window 210 for the AE is formed in the hood 212. A light guide 216 is attached to the light receiving window 210. A distal end of the light guide 216 is formed spherically or aspherically having a convex projected forwardly so as to have a positive refracting power. A photo detector 217 for light measurement is fixed to the other end of the light guide 216. Therefore, the light guide 216 and the photo detector 217 are also displaced in the direction of the optical axis in response to displacement of the hood 212 in the direction of the optical axis. Reference numeral 218 denotes an inner wall of a light shielding barrel for shielding undesirable light proceeding to the film in the camera body 101.

By the above described arrangement, in the case of the real focal length photographing mode in which trimming of the film is not performed at the time of printing of the film, the hood 212 is disposed at the retracted position shown by the dotted lines in FIG. 28, such a phenomenon does not take place that an image forming light bundle 219 proceeding towards one end of the frame A is intercepted by the hood 212. On the other hand, in the case of the pseudo focal length photographing mode in which trimming of the film is performed at the time of printing of the film, the hood 212 is projected to the position shown by the solid lines in FIG. 28 but such a phenomenon does not occur that an image forming light bundle 220 proceeding to the zone B on the film plane 214 to be printed is intercepted by the hood 212. However, at this time, light bundles proceeding towards a range between the zone B and the frame A are partially or wholly intercepted by the hood 212 but this fact offers no problem since the range is unnecessary at the time of printing of the film. Rather, since flare light rays 221, which are incident upon the objective lens system 213 from outside a zone to be photographed at the time when the hood 212 is not projected and which are diffused by the inner wall 218 of the light shielding barrel so as to proceed within the frame A, are intercepted by the hood 212, it becomes possible to raise contrast of the print at the time of trimming of the film and improve image quality of the print at the time of trimming of the film. In addition to the above described flare light rays 221, flare light rays detrimental to photography in the pseudo focal length photographing mode include light rays reflected on a peripheral face of the lens or an inner face of a lens frame.

Figure 29:
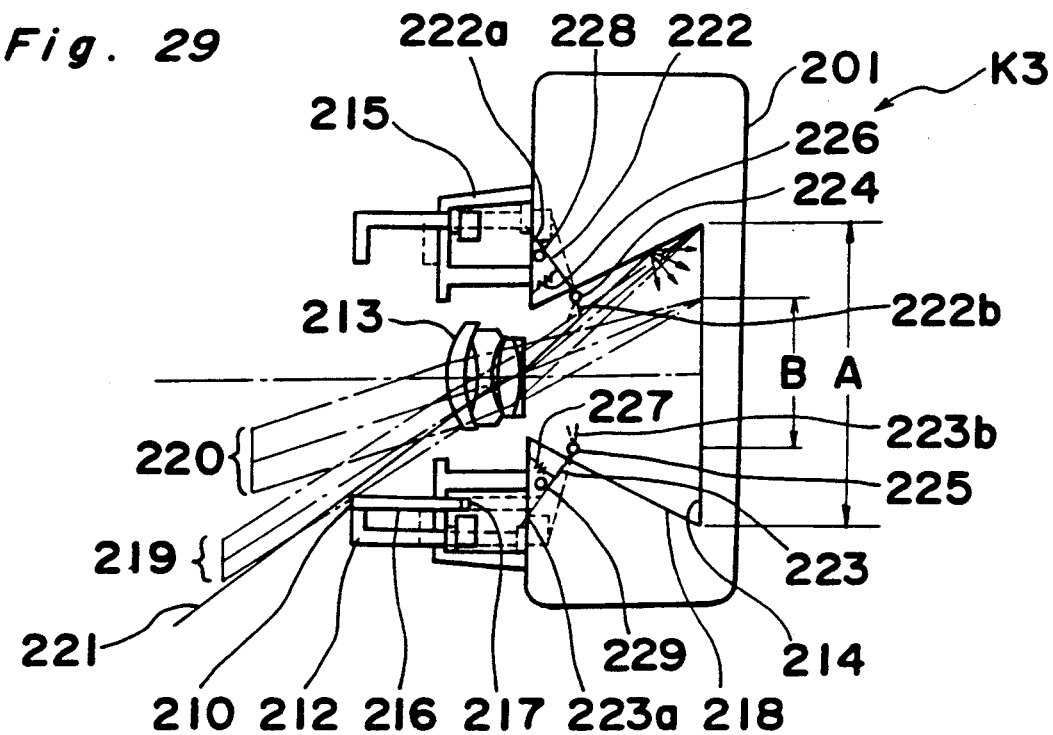
FIG. 29 is a view similar to FIG. 28, particularly showing a third embodiment of the present invention.

FIG. 29 shows the camera K3 according to the third embodiment of the present invention. In the camera K3, light shielding plates for shielding the above described flare light rays in the pseudo focal length photographing mode are provided. Namely, the camera K3 includes a pair of light shielding plates 222 and 223 disposed symmetrically with respect to the optical axis. The light shielding plates 222 and 223 are, respectively, rotatably supported by rotary shafts 224 and 225 mounted on the camera body 201. The light shielding plate 222 includes a long first arm 222a engageable with a rear end of the hood 212 and a short second arm 222b projectable into the optical path of the flare light rays. Likewise, the light shielding plate 223 includes a long first arm 223a engageable with the rear end of the hood 212 and a short second arm 223b projectable into the optical path of the flare light rays. The first arm 222a and the second arm 222b of the light shielding plate 222 are integrally formed with each other at a predetermined angle to each other. Similarly, the first arm 223a and the second arm 223b of the light shielding plate 223 are integrally formed with each other at a predetermined angle to each other. Furthermore, the light shielding plates 222 and 223 are, respectively, urged towards the hood 212 by springs 226 and 227. In the case of the pseudo focal length photographing mode of FIG. 29, the light shielding plate 222 is rotated in the counterclockwise direction in FIG. 29 by the spring 226 such that the first arm 222a is brought into contact with a stopper 228, with the second arm 222b being projected into the optical path of the flare light rays 221. At this time, the light shielding plate 223 is rotated in the clockwise direction in FIG. 29 by the spring 227 such that the first arm 223a is brought into contact with a stopper 229, with the second arm 223b being projected into the optical path of the flare light rays 221. Thus, in the pseudo focal length photographing mode, the flare light rays 221 and a portion or a whole of the image forming light bundle 219 in the real focal length photographing mode are shielded by the second arms 222b and 223b of the light shielding plates 222 and 223. Accordingly, in the camera K3, since these light ray are not required to be shielded by the hood 212, an inside diameter of the hood 212 of the camera K3 is made larger than that of the camera K2. In the camera K3, it is also possible to improve image quality of the print at the time of trimming of the film by shielding undesirable light bundles in the pseudo focal length photographing mode. In the case where the camera K3 is in the real focal length photographing mode in which the hood 212 is retracted to the position shown by the dotted lines in FIG. 29, the light shielding plates 222 and 223 are, respectively, rotated in the clockwise direction and the counterclockwise direction in FIG. 29 by the rear end of the hood 212 and thus, the second arms 222b and 223b do not intercept the image forming light bundle 219.

In the above described embodiments of the present invention, the two data imprinting portions for imprinting data such as date on the film are, respectively, provided on the trimmed image plane and the untrimmed image plane so as to be selectively operated. However, it can be also so arranged that one data imprinting portion is provided so as to be displaced to predetermined positions in accordance with the photographing mode.

Furthermore, it can be also so arranged that trimming magnifications are changed in a plurality of steps. In this case, a plurality of data imprinting portions corresponding to the trimming magnifications, respectively can be provided such that one of the data imprinting portions corresponding to a desired one of the trimming magnifications is selected. Alternatively, one data imprinting portion can also be provided so as to be displaced to predetermined positions corresponding to the trimming magnifications, respectively.

Meanwhile, the data imprinting portions are provided in the above described embodiments of the present invention. However, it can be also so arranged that the data imprinting portions are provided on the camera body.

As is clear from the foregoing description, in the camera of the present invention in which the trimming of the film can be performed automatically at the time of printing by designating trimming at the time of photographing an object, data such as date can be displayed at an optimum position on the print in accordance with the photographing mode.

Accordingly, in accordance with the present invention, since such a disadvantage associated with the prior art cameras enabling imprinting of data such as date on the film is obviated that valuable data such as date of photographing the object are lost from the print due to printing of the film through its trimming, pseudo focal length photography can be performed with much ease.

Furthermore, in accordance with the present invention, since the trimming data imprinting portion is also provided on the back cover provided with the date data imprinting portions, it is only necessary to incorporate into the camera body a mechanism for transmitting a minimum amount of trimming data to the back cover, thus resulting in drop of manufacturing cost of the camera body of the camera of the present invention. Meanwhile, since the signal processing units of the prior art data imprinting portions, etc. can be utilized for the back cover of the camera of the present invention, only a small number of mechanisms are required to be added to the back cover of the camera of the present invention, thereby resulting in reduction of manufacturing cost of the back cover of the camera of the present invention. Since the user of the camera can record trimming data on the film by designating trimming at the time of photographing the object, it becomes possible to print the film through automatic detection of presence and absence of trimming of the film at the time of simultaneous developing and printing of the film, so that such a troublesome procedure associated with the prior art cameras is eliminated that the trimming zone of the film is designated again after check of the print.

Moreover, the camera of the present invention enabling pseudo focal length photography comprises the mode selecting means for selectively changing over the camera to the real focal length photographing mode for printing the ordinary photographic zone and the pseudo focal length photographing mode for printing the zone narrower than the ordinary photographic zone, the light measuring means for measuring the brightness of the object to be photographed and the changeover means for changing over the light measuring zone of the light measuring means to the zone narrower than the light measuring zone of the real focal length photographing mode. Thus, in accordance with the present invention, since the light measuring zone of the light measuring means can be changed over according to the angles of view of the respective photographing modes, it becomes possible to obtain the properly exposed print in both photographing modes.

In addition, in accordance with the present invention, since not only the functions but the external appearance of the camera is changed upon changeover of the photographing modes in the camera, the user of the camera can readily recognize at a glance which one of the photographing modes the camera is set to, thereby resulting in prevention of erroneous operations of the camera.

Furthermore, in the camera of the present invention, since light rays incident upon the zone outside the remaining image plane zone after trimming are intercepted by the optical path restricting members such as the lens hood, the light shielding plate, etc. when the object is photographed in the pseudo focal length photographing mode, flare light produced by reflection of light on the inner face of the light shielding barrel or the inner face of the lens barrel can be reduced drastically. Therefore, in accordance with the present invention, contrast and image quality of the print photographed in the pseudo focal length photographing mode can be improved.

Although the present invention has been fully described by way of example with reference to the accompanying drawings, it is to be noted here that various changes and modifications will be apparent to those skilled in the art. Therefore, unless otherwise such changes and modification depart from the scope of the present invention, they should be construed as being included therein.

What is claimed is:

1. A photographic camera system comprising:
   a mode setting means for selectively setting said photographic camera system to a real focal length photographing mode for printing an ordinary photographic zone and a pseudo focal length photographing mode for printing a zone narrower than the ordinary photographic zone;
   a recording means for recording a signal corresponding to the pseudo focal length photographing mode when the pseudo focal length photographing mode is selected;
   a data imprinting means for selectively imprinting data such as a date at one of a plurality of different positions on a photographing portion of the film; and
   a selector means for selecting said one of the plurality of different positions in according with the settings of the real focal length photographing mode and the pseudo focal length photographing mode.

2. A photographic camera system as claimed in claim 1, wherein said recording means and said data imprinting means are provided on a back cover of said photographic camera system.

3. A photographic camera system as claimed in claim 1, wherein said data imprinting means comprises:
   a first data imprinting means which is selected by said selector means when said photographic camera system has been set to the real focal length photographing mode; and
   a second data imprinting means which is selected by said selector means when said photographic camera system has been set to the pseudo focal length photographing mode;
   said second data imprinting means imprinting on the film characters smaller than characters imprinted by said first data imprinting means.

4. A photographic camera system as claimed in claim 3, wherein the characters of said second data imprinting means are smaller than the characters of said first data imprinting means in accordance with a ratio of the real focal length to the pseudo focal length.

5. A photographic camera system comprising:
   a mode setting means for selectively setting said photographic camera system to a first mode for printing an ordinary photographic zone and a second mode for printing a zone which constitutes a part of said ordinary photographic zone;
   a recording means for recording a signal corresponding to the second mode when the second mode is selected;
   a data imprinting means for selectively imprinting data such as a date at one of a plurality of different positions on a photographing portion of the film; and
   a selector means for selecting said one of the plurality of different positions in accordance with the setting of the first mode and the second mode.

6. A photographic camera system as claimed in claim 5, wherein said recording means and said data imprinting means are provided on a back cover of said photographic camera system.

7. A photographic camera system as claimed in claim 5, wherein said data imprinting means comprises:
   a first data imprinting means which is selected by said selector means when said photographic camera system has been set to the first mode; and
   a second data imprinting means which is selected by said selector means when said photographic camera system has been set to the second mode;
   said second data imprinting means imprinting on the film characters smaller than characters imprinted by said first data imprinting means.

8. A photographic camera system comprising:
   a mode setting means for selectively setting said photographic camera system to a first mode for printing an ordinary photographic zone and a second mode for printing a zone which is different from said ordinary photographic zone;
   a recording means for recording a signal corresponding to the second mode when the second mode is selected;
   a data imprinting means for selectively imprinting data such as a date at one of a plurality of different positions on a photographing portion of the film; and
   a selector means for selecting said one of the plurality of different positions in accordance with the setting of the first mode and the second mode.

9. A photographic camera system as claimed in claim 8, wherein said recording means and said data imprinting means are provided on a back cover of said photographic camera system.

10. A photographic camera system as claimed in claim 8, wherein said data imprinting means comprises:
    a first data imprinting means which is selected by said selector means when said photographic camera system has been set to the first mode; and
    a second data imprinting means which is selected by said selector means when said photographic camera system has been set to the second mode;
    said first data imprinting means and said second data imprinting means imprinting on the film characters with respective sizes different from each other.

11. A photographic camera system comprising:
    a mode setting means for selectively setting said photographic camera system to a first mode for printing an ordinary photographic zone and a second mode for printing a second zone which constitutes a part of said ordinary photographic zone;
    a first imprinting means for imprinting a data at a first position on a photographing portion of a film when the first mode is set; and a second imprinting means for imprinting a data at a second position which is different from said first position on the photographing portion of the film here the second mode is set.

12. The photographic camera system of claim 11, further comprising a recording means for recording, when said second mode is set, a signal which indicates that said second zone is to be printed.

13. A photographic camera system comprising:
a mode setting means for selectively setting said photographic camera system to a first mode for printing an ordinary photographic zone and a second mode for printing a second zone which is different from said ordinary photographic zone;
a first imprinting means for imprinting a data at a first position on a photographing portion of a film when the first mode is set; and
a second imprinting means for imprinting a data at a second position which is different from said first position on the photographing portion of the film when the second mode is set.

14. The photographic camera system of claim 13, further comprising a recording means for recording, when said second mode is set, a signal which indicates that said second zone is to be printed.

15. A photographic camera system comprising:
a mode setting means for selectively setting said photographic camera system to a first mode for printing an ordinary photographic zone and a second mode for printing a second zone which constitutes a part of said ordinary photographic zone;
a first imprinting means for imprinting a data on a film when the first mode is set; and
a second imprinting means for imprinting, when the second mode is set, on the film a data which is different in size from the data imprinted by said first imprinting means.

16. The photographic camera system of claim 15, further comprising a recording means for recording, when said second mode is set, a signal which indicates that said second zone is to be printed.

17. A photographic camera system comprising:
a mode setting means for selectively setting said photographic camera system to a first mode for printing an ordinary photographic zone and a second mode for printing a second zone which is different from said ordinary photographic zone;
a first imprinting means for imprinting a data on a film when the first mode is set; and
a second imprinting means for imprinting on the film a data which is different in size from the data imprinted by said first imprinting means.

18. The photographic camera system of claim 17, further comprising a recording means for recording, when said second mode is set, a signal which indicates that said second zone is to be printed.

19. A photographic camera system comprising:
a mode setting means for selectively setting said photographic camera system to a first mode for printing an ordinary photographic zone and a second mode for printing a zone which constitutes a part of said ordinary photographic zone;
a data imprinting means for selectively imprinting data such as a date at one of a plurality of different positions on a photographing portion of th film; and
a selector means for selecting said one of the plurality of different positions in accordance with the setting of the first mode and the second mode.

20. A photographic camera system as claimed in claim 19, wherein said recording means and said data imprinting means are provided on a back cover of said photographic camera system 21. A photographic camera system as claimed in claim 19, wherein said data imprinting means comprises:
a first data imprinting means which is selected by said selector means when said photographic camera system has been set to the first mode; and
a second data imprinting means which is selected by said selector means when said photographic camera system has been set to the second mode;
said second data imprinting means imprinting on the film characters smaller than characters imprinted by said first data imprinting means.

22. A photographic camera system comprising:
a mode setting means for selectively setting said photographic camera system to a first mode for printing an ordinary photographic zone and a second mode for printing a zone which is different from said ordinary photographic zone;
a data imprinting means for selectively imprinting data such as a date at one of a plurality of different positions on a photographing portion of the film; and
a selector means for selecting said one of the plurality of different positions in accordance with the setting of the first mode and the second mode.

23. A photographic camera system as claimed in claim 22, wherein said recording means and said data imprinting means are provided on a back cover of said photographic camera system.

24. A photographic camera system as claimed in claim 22, wherein said data imprinting means comprises:
a first data imprinting means which is selected by said selector means when said photographic camera system has been set to the first mode; and
a second data imprinting means which is selected by said selector means when said photographic camera system has been set to the second mode;
said first data imprinting means and said second data imprinting means imprinting on the film characters with respective sizes different from each other.

* * * * *